US012154560B2

(12) United States Patent
Srinivasan et al.

(10) Patent No.: US 12,154,560 B2
(45) Date of Patent: Nov. 26, 2024

(54) SYSTEMS, METHODS, AND APPARATUSES FOR IMPROVING PERFORMANCE OF EXECUTING A WORKFLOW OPERATION

(71) Applicant: Vocollect, Inc., Pittsburgh, PA (US)

(72) Inventors: Ranganathan Srinivasan, Bangalore (IN); Rekula Dinesh, Bangalore (IN); Kaushik Hazra, Bangalore (IN); Duff H. Gold, Apollo, PA (US)

(73) Assignee: VOCOLLECT, INC., Pittsburgh, PA (US)

( * ) Notice: Subject to any disclaimer, the term of this patent is extended or adjusted under 35 U.S.C. 154(b) by 51 days.

(21) Appl. No.: 16/948,632

(22) Filed: Sep. 25, 2020

(65) Prior Publication Data

US 2022/0101842 A1    Mar. 31, 2022

(51) Int. Cl.
*G10L 15/22* (2006.01)
*G06N 20/00* (2019.01)
(Continued)

(52) U.S. Cl.
CPC .............. *G10L 15/22* (2013.01); *G06N 20/00* (2019.01); *G06Q 10/0633* (2013.01);
(Continued)

(58) Field of Classification Search
CPC ... G10L 15/22; G10L 15/063; G10L 15/1815; G10L 15/1822; G10L 2015/088;
(Continued)

(56) References Cited

U.S. PATENT DOCUMENTS 7,881,820 B2    2/2011  Antony et al.
8,756,059 B2    6/2014  Braho et al.
(Continued)

OTHER PUBLICATIONS

Vitech Group, "Vocollect Voice: Optimized Workflow Performance", Sep. 27, 2017, [brochure, online], [retrieved Jan. 7, 2021], retrieved from the Internet <https://scg-lm.s3.amazonaws.com/pdfs/vitech_wp_voice_guide_092717.pdf> (11 pages).
(Continued)

*Primary Examiner* — Michael Colucci
(74) *Attorney, Agent, or Firm* — Alston & Bird LLP

(57) ABSTRACT

A voice controlled apparatus for performing a workflow operation is described. The voice controlled apparatus can include a microphone, a speaker, and a processor. In some examples, the voice controlled apparatus can generate, via the speaker, a voice prompt associated with a task of a workflow and identify, via the microphone, a voice response received from a worker. In this regard, the voice prompt and the voice response can be a part of a voice dialogue. Further, the processor of the voice controlled apparatus can identify a performance status associated with the execution of the task, before providing a next voice prompt subsequent to the voice prompt. In this aspect, the performance status can be identified based on analyzing the voice dialogue using a machine learning model. Furthermore, the voice controlled apparatus can generate a message including a suggestion to improve the performance status of the task.

20 Claims, 12 Drawing Sheets

(51) Int. Cl.
*G06Q 10/0633* (2023.01)
*G10L 15/06* (2013.01)
*G10L 15/08* (2006.01)
*G10L 15/18* (2013.01)

(52) U.S. Cl.
CPC ........ *G10L 15/063* (2013.01); *G10L 15/1815* (2013.01); *G10L 15/1822* (2013.01); *G10L 2015/088* (2013.01); *G10L 2015/223* (2013.01)

(58) Field of Classification Search
CPC ... G10L 2015/223; G10L 15/18; G06N 20/00; G06Q 10/0633; G06Q 10/06; G06F 3/167
See application file for complete search history.

(56) References Cited

U.S. PATENT DOCUMENTS

| | | | | |
|---|---|---|---|---|
| 9,843,660 | B2 | 12/2017 | Dipiazza et al. | |
| 9,955,310 | B2* | 4/2018 | Venkat | G06Q 10/063118 |
| 9,996,819 | B1* | 6/2018 | Modi | G10L 15/22 |
| 2011/0060587 | A1* | 3/2011 | Phillips | G10L 15/30 |
| | | | | 704/235 |
| 2011/0153614 | A1* | 6/2011 | Solomon | B65G 1/127 |
| | | | | 707/769 |
| 2011/0295644 | A1* | 12/2011 | Hara | G06Q 10/0639 |
| | | | | 705/7.38 |
| 2012/0320058 | A1* | 12/2012 | Stephen | G06T 15/20 |
| | | | | 345/428 |
| 2016/0092805 | A1* | 3/2016 | Geisler | G06Q 10/08 |
| | | | | 705/7.27 |
| 2017/0032162 | A1* | 2/2017 | Calvarese | G06K 7/0004 |
| 2018/0336894 | A1* | 11/2018 | Graham | G10L 15/22 |
| 2019/0114572 | A1* | 4/2019 | Gold | G10L 15/26 |
| 2019/0333178 | A1* | 10/2019 | Cheng | G06Q 50/265 |
| 2020/0380980 | A1* | 12/2020 | Shum | G10L 15/18 |
| 2021/0064937 | A1* | 3/2021 | Nguyen | G06V 20/20 |
| 2021/0158241 | A1* | 5/2021 | Nashif | G06Q 10/063114 |

OTHER PUBLICATIONS

Extended European search report Mailed on Mar. 3, 2022 for EP Application No. 21196174, 7 pages.
U.S. Appl. No. 62/097,480 for "Distributed Headset With Electronics Module," filed Dec. 29, 2014.
U.S. Appl. No. 62/101,568 for "Tag Mounted Electronics Module for Distributed Headset," filed Jan. 9, 2015.

* cited by examiner

SYSTEMS, METHODS, AND APPARATUSES FOR IMPROVING PERFORMANCE OF EXECUTING A WORKFLOW OPERATION

TECHNOLOGICAL FIELD

Example embodiments described herein relate generally to systems, methods, and apparatuses for improving performance of executing a workflow operation, and, more particularly, to providing suggestions to workers to improve performance of the workers in executing the workflow operation.

BACKGROUND

In many environments (e.g., but not limited to, distribution centers, warehouses, inventories, industrial sites, etc.) certain activities or tasks are performed by workers in form of a workflow where each task is divided into a series or sequence of steps which are to be executed for completion of the task. As an example, a picking workflow can be related to an operation for picking various items in a material handling site. In some examples, tasks of a workflow are performed using voice dialogue where instructions for performing each step of the workflow is provided to the worker as voice prompts (like in case of an interactive voice response IVR system) to which the workers can respond back in form of voice responses (i.e. audible response or spoken responses). In some examples, a performance of execution of the workflow depends on various factors, e.g. but not limited to, quality of executing the task, turn-around time for executing the task, seamless exchange of voice prompts and voice responses, etc. Real-time monitoring of performance of execution of the workflow helps in various ways, for example, but not limited to, effectively planning workflow operations for a work shift, planning work-schedule for a worker, committing delivery deadlines to customers etc. Typically, in situations, where workflow operations are performed using voice dialogue, monitoring performance of execution of workflow operations in real-time is challenging and has associated limitations.

SUMMARY

Various example embodiments described herein relates to a voice controlled apparatus. The voice controlled apparatus can include a microphone, a speaker, and a processor. The processor can be communicatively coupled to at least one of the microphone and the speaker. The processor can be configured to generate, via the speaker, a voice prompt associated with a task of a workflow. Further, the processor can be configured to identify, via the microphone, a voice response from a worker in response to the voice prompt. In this regard, the voice prompt and the voice response can be a part of a voice dialogue. Furthermore, the processor of the voice controlled apparatus, can be configured to identify a performance status associated with the execution of the task. The processor can identify the performance status before providing a next voice prompt subsequent to the voice prompt. The performance status can be identified based on analyzing the voice dialogue using a machine learning model. Furthermore, the processor can be configured to generate a message including a suggestion to improve the performance status of the task.

According to some example embodiments, the performance status can be indicative of at least one of: a delay in execution of the task of the workflow, a coordination gap corresponding to the voice prompt and the voice response provided by the worker, and an incorrect execution of the task of the workflow.

According to some example embodiments, the processor of the voice controlled apparatus can be configured to access a data file comprising a historical voice dialogue corresponding to a past execution of the task. Further, the processor can be configured to parse the data file to identify, from amongst a plurality of historical voice responses in the historical voice dialogue, a contextual keyword and a contextual parameter associated with the contextual keyword. In some examples, the contextual parameter can include at least one of, a frequency of occurrence of the contextual keyword in the historical voice dialogue and a timing information corresponding to each occurrence of the contextual keyword in the historical voice dialogue. Furthermore, the processor can be configured to provide the contextual keyword and the contextual parameter as an input feature to train the machine learning model.

According to some example embodiments, the processor can be further configured to identify, using the machine learning model, a pattern associated with the contextual keyword and the contextual parameter. In this regard, the machine learning model can identify the pattern based on a pre-defined rule defined according to a type of task of the workflow. Further, the processor can be configured to predict a classification indicative of the performance status associated with execution of the task by using the pattern.

In accordance with some example embodiments, the suggestion to improve the performance status can be indicative of at least one of: (a) a correct location for picking an item, (b) a correct destination for placing the item, (c) a route for reaching one of: an item picking location or an item placement destination, (d) an expected voice response to the voice prompt according to the workflow, (e) re-training a speech recognition model according to a level of noise in a work environment, (f) retraining the speech recognition model according to a speaker dependent voice template, (g) a new workflow which is preferred for the worker, and (h) an option to reassign the task of the worker to another worker.

According to some example embodiments the task can be to pick an item. In this regard, the processor can be configured to identify the performance status indicative of one of: (a) a slow picking, in an instance in which a time taken to pick the item is slower than an expected time to pick the item and (b) a normal picking, in an instance in which the time taken to pick the item is as per the expected time to pick the item.

Some example embodiments described herein relates to a system that includes a processor. The processor can be configured to receive a voice dialogue associated with a task of a workflow that is to be executed on a voice controlled apparatus. The voice dialogue can include a first voice prompt and a first voice response to the first voice prompt. Further, the processor can be configured to identify a performance status associated with execution of the task based on analyzing the voice dialogue using a machine learning model. In this regard, the performance status can be identified before providing a second voice prompt subsequent to the first voice prompt. Further, the processor can be configured to generate, a message indicative of a suggestion to improve the performance status of the task.

According to some example embodiments, the performance status can be indicative of at least one of: a delay in execution of the task of the workflow, a coordination gap corresponding to the voice prompt and the voice response provided by the worker, and an incorrect execution of the task of the workflow.

According to some example embodiments, the processor can be configured to access a data file comprising a historical voice dialogue corresponding to a past execution of the task. Further, the processor can be configured to parse the data file to identify, from amongst a plurality of historical voice responses in the historical voice dialogue, a contextual keyword and a contextual parameter associated with the contextual keyword. In some examples, the contextual parameter can include at least one of, a frequency of occurrence of the contextual keyword in the historical voice dialogue and a timing information corresponding to each occurrence of the contextual keyword in the historical voice dialogue. Furthermore, the processor can be configured to provide the contextual keyword and the contextual parameter as an input feature to train the machine learning model.

According to some example embodiments, the processor can be further configured to identify, using the machine learning model, a pattern associated with the contextual keyword and the contextual parameter. In this regard, the machine learning model can identify the pattern based on a pre-defined rule defined according to a type of task of the workflow. Further, the processor can be configured to predict a classification indicative of the performance status associated with execution of the task by using the pattern.

In accordance with some example embodiments, the suggestion to improve the performance status can be indicative of at least one of: (a) a correct location for picking an item, (b) a correct destination for placing the item, (c) a route for reaching one of: an item picking location or an item placement destination, (d) an expected voice response to the voice prompt according to the workflow, (e) re-training a speech recognition model according to a level of noise in a work environment, (f) retraining the speech recognition model according to a speaker dependent voice template, (g) a new workflow which is preferred for the worker, and (h) an option to reassign the task of the worker to another worker.

According to some example embodiments the task can be to pick an item. In this regard, the processor of the system can be configured to identify the performance status indicative of one of: (a) a slow picking, in an instance in which a time taken to pick the item is slower than an expected time to pick the item and (b) a normal picking, in an instance in which the time taken to pick the item is as per the expected time to pick the item.

In some example embodiments, the processor of the system can be configured to transmit, a file including the workflow on an electronic device. In this regard, the workflow can be executed based on exchange of messages between the electronic device and the voice controlled apparatus. Further, the processor can be configured to receive, workflow execution data comprising the voice dialogue associated with the execution of the task of the workflow by the worker.

Some example embodiments described herein relates to a method for improving a performance status of a task of a workflow. The method includes receiving a voice dialogue that includes a first voice prompt and a first voice response to the first voice prompt, associated with the task of the workflow. Further, the method includes identifying a performance status associated with execution of the task based on analyzing the voice dialogue using a machine learning model. In this regard, the performance status can be identified before providing a second voice prompt subsequent to the first voice prompt. Furthermore, the method includes generating a message indicative of a suggestion to improve the performance status of the task.

In some example embodiments, the method further can include identifying, using the machine learning model, a pattern associated with the contextual keyword and the contextual parameter. In this regard, the machine learning model can be used to identify the pattern based on a pre-defined rule defined according to a type of task of the workflow. Furthermore, the method can include predicting a classification indicative of the performance status associated with execution of the task by using the pattern.

According to an example embodiment, the method can include transmitting, a file comprising the workflow on an electronic device. In this regard, the workflow can be executed based on exchange of messages between the electronic device and a voice controlled apparatus. Further, the method can include receiving, workflow execution data that can include the voice dialogue associated with the execution of the task of the workflow by the worker.

BRIEF DESCRIPTION OF THE DRAWINGS

The accompanying drawings illustrate embodiments of the invention, and, together with the specification, including the general description above and the detailed description which follows, serve to explain the features of the present invention.

DETAILED DESCRIPTION

Figure 1:
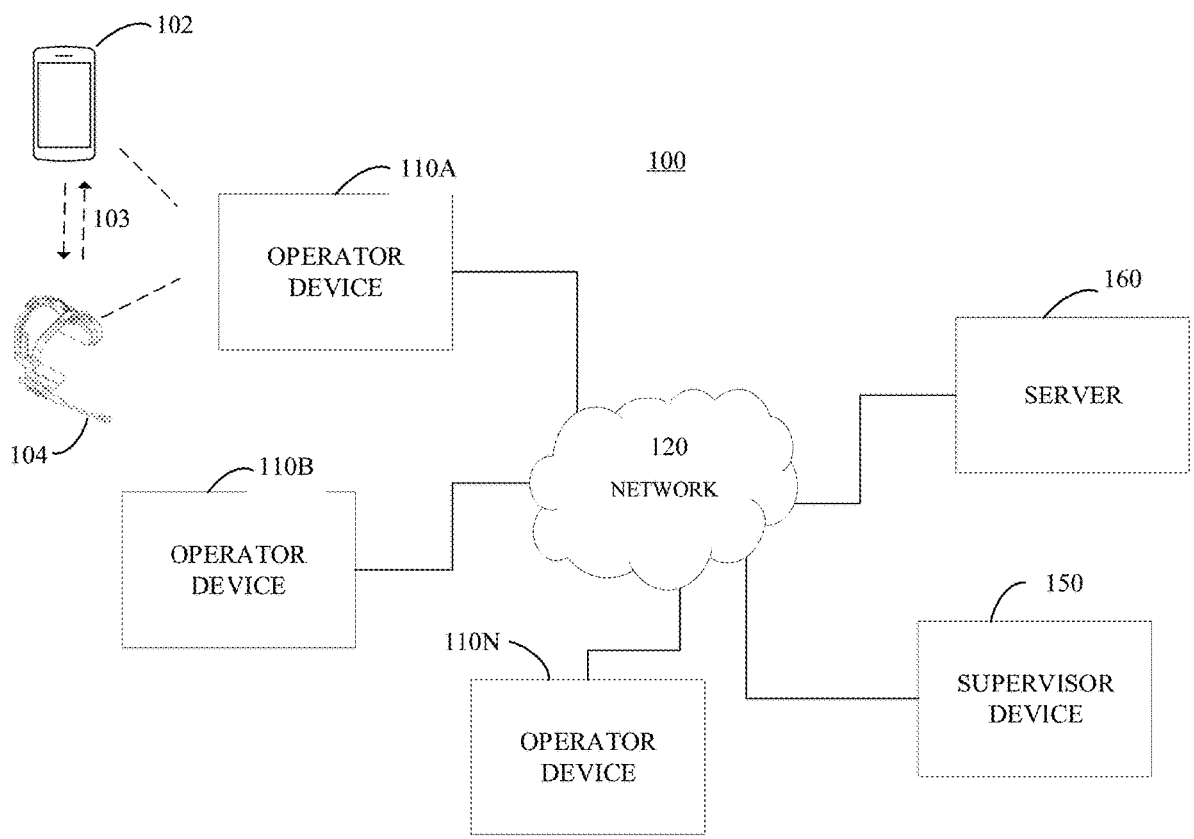
FIG. 1 illustrates a schematic of a workflow performance system according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," "outside," "inside," etc. are used for explanatory purposes in the examples provided below to describe the relative position of certain devices or portions of devices. Terminology used in this patent is not meant to be limiting insofar as devices described herein, or portions thereof, may be attached or utilized in other orientations.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "transmitter" refers to any component that can generate radio waves for communication purposes while a "receiver" is used to generally refer to any component that can receive radio waves and convert the information into useable form. A "transceiver" generally refers to a component that can both generate radio waves and receive radio waves and is thus contemplated when either a transmitter or a receiver is discussed.

The term "processor" is used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory can also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device and memory within the processors themselves. For instance, memory may be any non-transitory computer readable medium having computer readable instructions (e.g., computer program instructions) stored thereof that are executable by a processor.

The term "electronic device" used hereinafter refers to any or all of, handheld devices, mobile phones, wearable devices, personal data assistants (PDAs), tablet computers, smart books, palm-top computers, barcode readers, scanners, indicia readers, imagers, Radio-frequency identification (RFID readers or interrogators), vehicle-mounted computers, wearable barcode scanners, wearable indicia readers, a point of sale (POS) terminal, headset devices, programmable logic controllers (PLCs), programmable automation controllers (PACs), industrial computers, laptop computers, desktop computers, personal computers, and similar electronic devices equipped with at least a processor configured to perform the various operations described herein.

The various embodiments are described herein using the term "computing platform" or "master device" or "server" or "supervisor device" used interchangeably for the purpose of brevity. The term "server" can be used herein to refer to any computing device or a distributed network of computing device capable of functioning as a server, such as a master exchange server, web server, mail server, document server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smartphone, thereby enabling it to function as an Internet server (e.g., an enterprise e-mail server) only to the extent necessary to provide the functionality described herein.

In some example embodiments, the server may correspond to any of, an industrial computer, a cloud computing-based platform, an external computer, a standalone computing device, and/or the like. In some example embodiments, the master device or the computing platform, can also refer to any of the electronic devices, as described herein. In some example embodiments, the server may include an access point or a gateway device that can be capable of communicating directly with one or more electronic devices and can also be capable of communicating (either directly or alternatively indirectly via a communication network such as the Internet) with a network establishment service (e.g. Internet service provider). In some example embodiments, the server can manage the deployment of one or more electronic devices throughout a physical environment. In some example embodiments, the server may refer to a network establishment service including distributed systems where multiple operations are performed by utilizing multiple computing resources deployed over a network and/or a cloud-based platform or cloud-based services, such as any of a software-based service (SaaS), infrastructure-based service (IaaS) or platform-based service (PaaS) and/or like.

In some example embodiments, the term "server" can be used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, tablets, headsets, and smartwatches are generally collectively referred to as mobile devices.

The components illustrated in the figures represent components that may or may not be present in various embodiments of the invention described herein such that embodiments may include fewer or more components than those shown in the figures while not departing from the scope of the invention.

Various example embodiments described herein relates to techniques for improving a performance of execution of a workflow operation. According to some examples, the workflow operation can be performed based on a voice dialogue which can include exchange of voice prompts and voice responses between an operator and a voice controlled apparatus used by the operator. An example workflow operation can be an operation for performing picking of various items in a material handling environment (e.g. a warehouse, inventory etc.). According to some example embodiments, a machine learning model can be used to identify a performance status associated with execution of one or more steps of the workflow operation. The performance status is indicative of a progress and/or performance of the execution of the workflow operation as compared to expected performance metrics (e.g. efficiency, throughput, turn-around time etc.). For instance, in an example, the machine learning model can be used to predict if a picking operation performed by an operator is a slow picking operation. According to various example embodiments described herein, the prediction of the performance status can be performed at an early stage of execution of the steps of picking operation i.e. before completion of the workflow operation. In some examples, early identification of the performance status enables the operator to perform a corrective action 'on-the-go' i.e. while completing the workflow operation. Further, according to some example embodiments, based on the identified performance status, contextual suggestions can be provided to operators performing the workflow operation. The contextual suggestions can be indicative of an activity that can be performed to improve the performance status of the execution of the workflow operation. In some examples, the performance status of operations performed by various operators can be displayed as predictive metrics on a dashboard in real-time and used by a supervisor for improving productivity of the operators in a work environment. As an example, for the picking operation, the predictive metrics can include predictive pick rate, context/reason for slow pick against each pick, daily/weekly report etc. According to some examples, the contextual suggestions can be provided according to a workflow state associated with a step of the workflow operation to improve overall execution of the workflow operation. Further details related to identification of performance status and improving execution of workflow operations are described according to various example embodiments described herein in reference to FIGS. 1-12.

FIG. 1 shows workflow performance system 100 including an example network architecture for a system, which may include one or more devices and sub-systems that can be configured to implement some embodiments discussed herein. For example, workflow performance system 100 may include server 160, which can include, for example, the circuitry disclosed in FIGS. 2-4, a server, or database, among other things (not shown). The server 160 may include any suitable network server and/or other type of processing device. In some embodiments, the server 160 may receive requests and transmit information or indications regarding such requests to operator devices 110A-110N and/or one or more supervisor devices 150. The operator devices 110A-110N referred herein can correspond to electronic devices that may be used by operators (e.g. workers) in a work environment while performing various tasks. Further, the supervisor devices 150 referred herein can correspond to electronic devices used by a supervisor of the operators in the work environment. In an example, the work environment can correspond to a warehouse or inventory and the supervisor can be a warehouse manager.

In some example embodiments, the server 160 can communicate with one or more operator devices 110A-110N and/or one or more supervisor devices 150 via network 120. In this regard, network 120 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, network 120 may include a cellular telephone, an 802.11, 802.16, 802.20, and/or WiMax network. In some embodiments, Bluetooth may be used to communicate between devices. Further, the network 120 may include a public network, such as the Internet, a private network, such as an intranet, or combinations thereof, and may utilize a variety of networking protocols now available or later developed including, but not limited to TCP/IP based networking protocols.

In some example embodiments, the network 103 can include, but are not limited to, a Wireless Fidelity (Wi-Fi) network, a Piconet, a Personal Area Network (PAN), Zigbee, and a Scatternet. In some examples, the network 103 can correspond to a short range wireless network through which the operator devices 102-10N can communicate with each other using one or more communication protocols such as, but are not limited to, Wi-Fi, Bluetooth, Bluetooth low energy (BLE), Zigbee, Ultrasonic frequency based network, and Z-Wave. In some examples, the network 103 can correspond to a network in which the plurality of electronic devices 102-10N can communicate with each other using other various wired and wireless communication protocols such as Transmission Control Protocol and Internet Protocol (TCP/IP), User Datagram Protocol (UDP), and 2G, 3G, or 4G communication protocols. In some examples, the network 103 can correspond to any communication network such as, but not limited to, LORA, cellular (NB IoT, LTE-M, Leaky Feeder Coax, etc.)

In some example embodiments, the operator devices 110A-110N, supervisor device 150, and/or server 160 may each be implemented as a computing device, such as a personal computer and/or other networked device, such as a cellular phone, tablet computer, mobile device, point of sale terminal, inventory management terminal etc. The depiction in FIG. 1 of "N" members is merely for illustration purposes. Further, while only one supervisor device 150 is illustrated in FIG. 1, in some embodiments, multiple or a plurality of supervisor device 150 may be connected in the system. Furthermore, any number of users, operator devices and/or or supervisor devices may be included in the workflow performance system 100. In one embodiment, the operator devices 110A-110N and/or supervisor devices 150 may be configured to display an interface on a display of the respective device for viewing, creating, editing, and/or otherwise interacting with the server. According to some embodiments, the server 160 may be configured to display the interface on a display of the server 160 for viewing, creating, editing, and/or otherwise interacting with information on the server 160. In some embodiments, an interface of operator devices 110A-110N and/or supervisor device 150 may be different from an interface of a server 160. Various components of the present system may be performed on one or more of the operator devices 110A-110N, supervisor device 150, or server 160. Workflow performance system 100 may also include additional client devices and/or servers, among other things.

According to some example embodiments, the operator devices 110A-110N can include, for example, but not limited to, an electronic device 102 (e.g. a mobile device, a PDA etc.) and a voice controlled apparatus 104 (e.g. a headset device, a wearable head mounting device etc.). In this regard, an operator in the work environment can use the electronic device 102 and/or the voice controlled apparatus 104 to perform one or more operations in the work environment. For instance, in some example embodiments, the operator devices 110A-110N can be used by operators to execute a workflow operation that can include one or more tasks. In this regard, in some examples, the workflow operation can include a sequence or series of steps to be performed by the operator. In some example embodiments, one or more steps of the workflow operation can be provided in form of voice directed instructions or graphical user interface (GUI) based instructions to the operators on the operator devices 110A-110A.

As an example, in a work environment (e.g. a warehouse, an industrial environment, a distribution center, etc.), an operator can use the electronic device 102 that can be preconfigured with an application (e.g. a mobile application) to execute a workflow operation. For instance, in some examples, the operators can use these devices (i.e. the operator devices 110A-110N, electronic devices for automatic identification and data capturing of information and to improve productivity in the work environment. In some examples, the application can be used to execute various steps of the workflow operation. According to some example embodiments, the application can be installed on at least one of the electronic device 102 and the voice controlled apparatus 104 and can be used to generate instructions for the operators at each step of the workflow operation. These instructions can be provided on the electronic device 102 and/or the voice controlled apparatus 104.

According to some example embodiments, the voice controlled apparatus 104 can be used to provide instructions to the operators in form of 'voice prompts' to perform various activities in the work environment. For instance, in an example, for a picking workflow operation, the operators can be provided instructions in form of voice prompts on the voice controlled apparatus 104 for picking various items in an inventory. The voice prompts in such case may include instructions for the operators, like, but not limited to, 'reach to a location of the inventory', 'confirm a check-digit associated with the location', 'identify an item from amongst several item', 'confirm a stock keeping unit (SKU) associated with the item', 'pick the item', 'move to next location', and so on. Further, in some example embodiments, the electronic device 102 can be configured to provide instructions to the operators in visual form i.e. instructions that can be displayed on a GUI of the electronic device 102. Accordingly, the operators can perform a step of the workflow operation based on instructions provided in the voice prompt and/or visual prompt. Further, the electronic device 102 and/or the voice controlled apparatus 104 can be configured to receive operator's response to the instructions. For instance, as the operators perform the task, the operators can provide a 'voice response' and/or a GUI input based response on the voice controlled apparatus 104 and/or the electronic device 102, respectively.

Illustratively, the operator devices 110A-110N are communicative coupled over the network 103. Similarly, in accordance with some example embodiments, the electronic device 102 can be communicatively coupled to the voice controlled apparatus 104 via the network 103. As an example, the voice controlled apparatus 104 can be communicatively coupled to the electronic device 102 over a Bluetooth communication based network. In this regard, the electronic device 102 can exchange data and various commands with the voice controlled apparatus 104 using the Bluetooth network.

In some examples, voice based instructions and visual based instructions of the task of the workflow may be provided simultaneously on the voice controlled apparatus 104 and the electronic device 102, respectively. In this regard, a state of execution of workflow on the electronic device 102 and/or the voice controlled apparatus 104 can be synchronized such that, either of a voice response and/or a GUI based input can be provided by the operator in response to the voice prompt and/or visual instruction for a same step of workflow operation to cause the workflow operation to move to a next state on both the voice controlled apparatus 104 and the electronic device 102.

According to some example embodiments, the operator devices 110A-110N can receive a file including one or more workflows that are to be executed on the operator device 110A-110N. In this regard, according to some example embodiments, a workflow operation can be executed on the operator devices 110A-110N (e.g., the electronic device 102 and/or the voice controlled apparatus 102) based on exchange of messages between the devices. In some example embodiments, the operator devices 110A-110N can receive the file including the one or more workflows from the server 160.

According to some example embodiments, the electronic device 102, the voice controlled apparatus 104, the operator devices 110A-110N, supervisor device 150, and/or server 160 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, the operator devices 110A-110N, supervisor device 150, and/or server 160 may include one or more output devices, including but not limited to a display, a speaker, a haptic feedback mechanism, a printer, lights, any other mechanism capable of presenting an output to a user, or any combination thereof.

The operator devices 110A-110N, supervisor device 150, and/or server 160 may include components for monitoring and/or collecting information regarding the user or external environment in which the component is placed. For instance, the operator devices 110A-110N, supervisor device 150, and/or server 160 may include sensors, scanners, and/or other monitoring components. In some embodiments, scanners may be used to determine the presence of certain individuals or items. For example, in some embodiments, the components may include a scanner, such as an optical scanner, RFID scanner, and/or other scanner configured to read human and/or machine readable indicia physically associated with an item.

Figure 2:
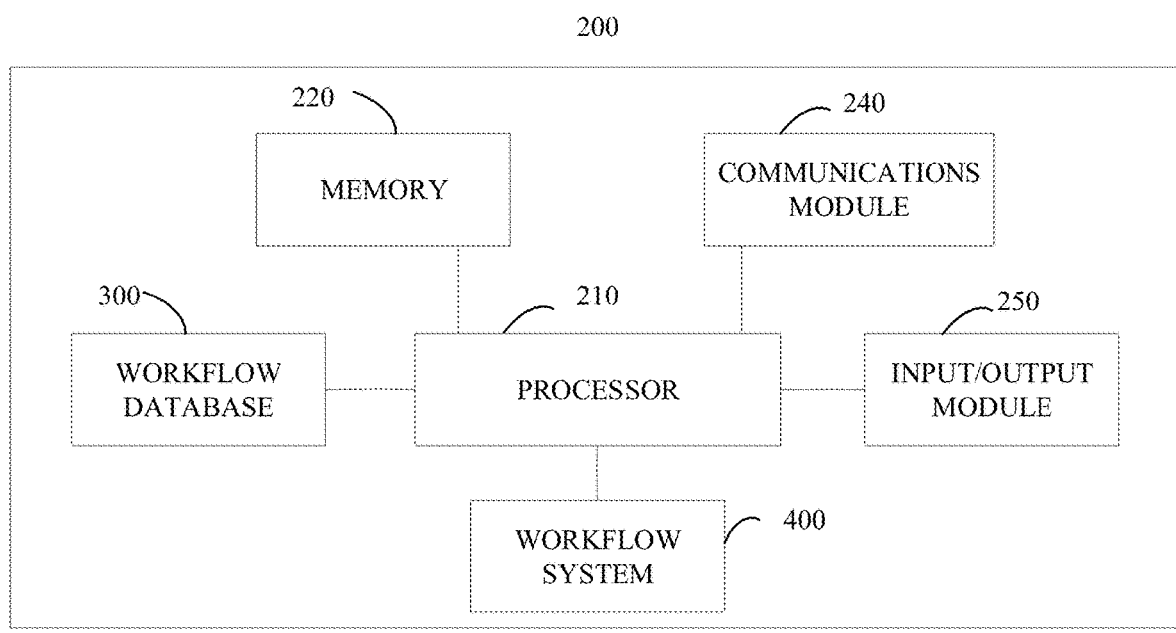
FIG. 2 illustrates a schematic block diagram of a workflow performance system according to an example embodiment.

FIG. 2 shows a schematic block diagram of circuitry 200, some or all of which may be included in, for example, the electronic device 102, the voice controlled apparatus 104, the operator devices 110A-110N, the supervisor device 150, and/or the server 160. Any of the aforementioned systems or devices may include the circuitry 200 and may be configured to, either independently or jointly with other devices in a network 120 perform the functions of the circuitry 200 described herein. As illustrated in FIG. 2, in accordance with some example embodiments, circuitry 200 can includes various means, such as processor 210, memory 220, communications module 240, and/or input/output module 250. In some embodiments, workflow database 300 and/or workflow system 400 may also or instead be included. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, and/or the like), a computer program product comprising computer-readable program instructions stored on a non-transitory computer-readable medium (e.g., memory 220) that is executable by a suitably configured processing device (e.g., processor 210), or some combination thereof.

Processor 210 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments processor 210 comprises a plurality of processors. The plurality of processors may be embodied on a single computing device or may be distributed across a plurality of computing devices collectively configured to function as circuitry 200. The plurality of processors may be in operative communication with each other and may be collectively configured to perform one or more functionalities of circuitry 200 as described herein. In an example embodiment, processor 210 is configured to execute instructions stored in memory 220 or otherwise accessible to processor 210. These instructions, when executed by processor 210, may cause circuitry 200 to perform one or more of the functionalities of circuitry 200 as described herein.

Whether configured by hardware, firmware/software methods, or by a combination thereof, processor 210 may comprise an entity capable of performing operations according to embodiments of the present invention while configured accordingly. Thus, for example, when processor 210 is embodied as an ASIC, FPGA or the like, processor 210 may comprise specifically configured hardware for conducting one or more operations described herein. Alternatively, as another example, when processor 210 is embodied as an executor of instructions, such as may be stored in memory 220, the instructions may specifically configure processor 210 to perform one or more algorithms and operations described herein, such as those discussed in connection with FIGS. 1-12.

Memory 220 may comprise, for example, volatile memory, non-volatile memory, or some combination thereof. Although illustrated in FIG. 2 as a single memory, memory 220 may comprise a plurality of memory components. The plurality of memory components may be embodied on a single computing device or distributed across a plurality of computing devices. In various embodiments, memory 220 may comprise, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. Memory 220 may be configured to store information, data (including item data and/or profile data), applications, instructions, or the like for enabling circuitry 200 to carry out various functions in accordance with example embodiments of the present invention. For example, in at least some embodiments, memory 220 is configured to buffer input data for processing by processor 210. Additionally, or alternatively, in at least some embodiments, memory 220 is configured to store program instructions for execution by processor 210. Memory 220 may store information in the form of static and/or dynamic information. This stored information may be stored and/or used by circuitry 200 during the course of performing its functionalities.

Communications module 240 may be embodied as any device or means embodied in circuitry, hardware, a computer program product comprising computer readable program instructions stored on a computer readable medium (e.g., memory 220) and executed by a processing device (e.g., processor 210), or a combination thereof that is configured to receive and/or transmit data from/to another device and/or network, such as, for example, a second circuitry 200 and/or the like. In some embodiments, communications module 240 (like other components discussed herein) can be at least partially embodied as or otherwise controlled by processor 210. In this regard, communications module 240 may be in communication with processor 210, such as via a bus. Communications module 240 may include, for example, an antenna, a transmitter, a receiver, a transceiver, network interface card and/or supporting hardware and/or firmware/software for enabling communications with another computing device. Communications module 240 may be configured to receive and/or transmit any data that may be stored by memory 220 using any protocol that may be used for communications between computing devices. Communications module 240 may additionally or alternatively be in communication with the memory 220, input/output module 250 and/or any other component of circuitry 200, such as via a bus.

Input/output module 250 may be in communication with processor 210 to receive an indication of a user input and/or to provide an audible, visual, mechanical, or other output to a user (e.g., employee and/or customer). Some example visual outputs that may be provided to a user by circuitry 200 are discussed in connection with FIGS. 1-12. As such, input/output module 250 may include support, for example, for a keyboard, a mouse, a joystick, a display, a touch screen display, a microphone, a speaker, a RFID reader, barcode reader, biometric scanner, and/or other input/output mechanisms. In embodiments wherein circuitry 200 is embodied as a server or database, aspects of input/output module 250 may be reduced as compared to embodiments where circuitry 200 is implemented as an end-user machine (e.g., remote worker device and/or employee device) or other type of device designed for complex user interactions. In some embodiments (like other components discussed herein), input/output module 250 may even be eliminated from circuitry 200. Alternatively, such as in embodiments wherein circuitry 200 is embodied as a server or database, at least some aspects of input/output module 250 may be embodied on an apparatus used by a user that is in communication with circuitry 200. Input/output module 250 may be in communication with the memory 220, communications module 240, and/or any other component(s), such as via a bus. One or more than one input/output module and/or another component can be included in circuitry 200.

The workflow database 300 and the workflow system 400 may also or instead be included and configured to perform the functionality discussed herein related to workflow and/or identifying performance status associated with an execution of the workflow. In some embodiments, some or all of the functionality of generating and/or information for workflow and/or performance status associated with execution of the workflow may be performed by processor 210. In this regard, the example processes and algorithms discussed herein can be performed by at least one processor 210, workflow database 300, and/or workflow system 400. For example, non-transitory computer readable media can be configured to store firmware, one or more application programs, and/or other software, which include instructions and other computer-readable program code portions that can be executed to control each processor (e.g., processor 210, workflow database, and/or workflow system) of the components of circuitry 200 to implement various operations, including the examples shown above. As such, a series of computer-readable program code portions are embodied in one or more computer program goods and can be used, with a computing device, server, and/or other programmable apparatus, to produce machine-implemented processes.

Figure 3:
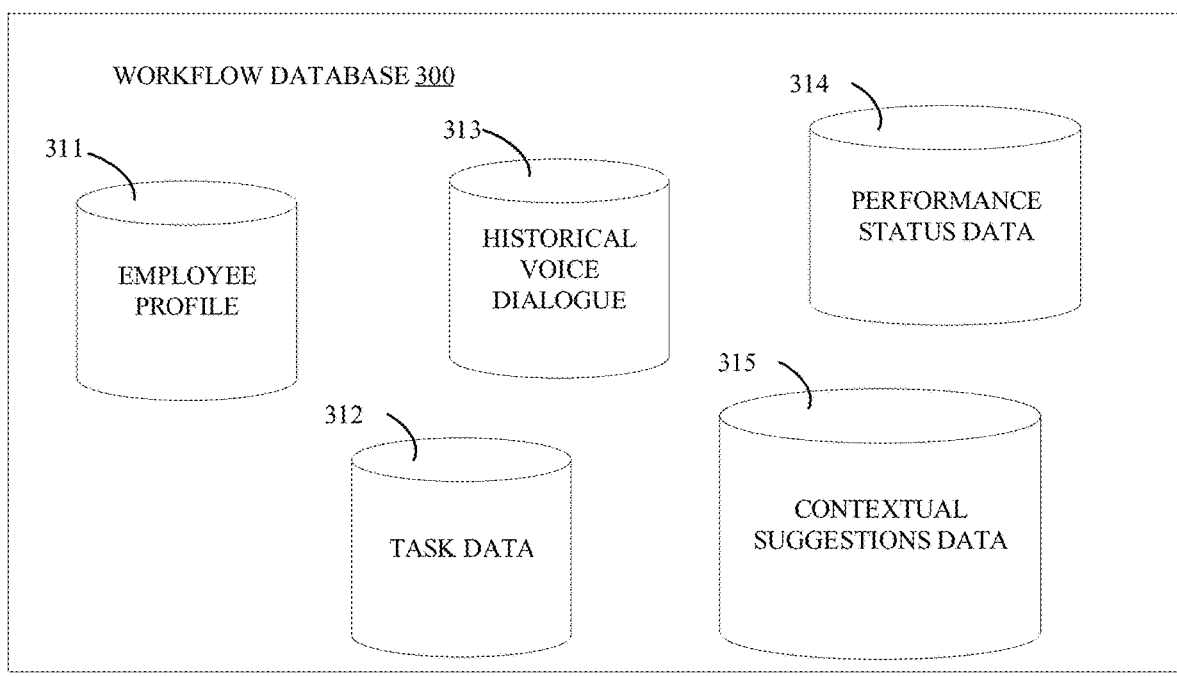
FIG. 3 illustrates a schematic block diagram of a workflow database according to an example embodiment.

As illustrated in FIG. 3, according to some example embodiments, a workflow database 300 may be provided that includes various relevant information for the workflow performance system. For instance, as shown in FIG. 3, in this embodiment, the workflow database 300 can include employee profile data 311, task data 312, historical voice dialogue data 313, performance status data 314, and contextual suggestions data 315. Various other data may be included in the workflow database 300. As additional tasks are performed, the system 200 may receive additional information regarding the tasks and the employee (e.g., performance information), which may be stored in the workflow database 300. In addition, additional information related to various products, services, workflow operations related to a work environment can be stored in the workflow database 300 use. Additionally, or alternatively, the workflow database 300 may include contextual suggestion data 315 which provides any additional information needed by the workflow system 400 in analyzing inputs and requests and generating the appropriate response.

For example, workflow system 400 can be configured to analyze multiple sets of data (e.g., including various combinations of employee profile data, task data, historical voice dialogue data, performance status data, contextual suggestions data, etc.), such as the data in the workflow database 300. In this way, the workflow system 400 may support multiple algorithms, including those discussed below with respect to employee profile data, task data, historical voice dialogue data, performance status data, contextual suggestions data etc., so that the selected algorithm may be chosen at runtime. Further, the present configuration can enable flexibility in terms of configuring additional contexts.

Figure 4:
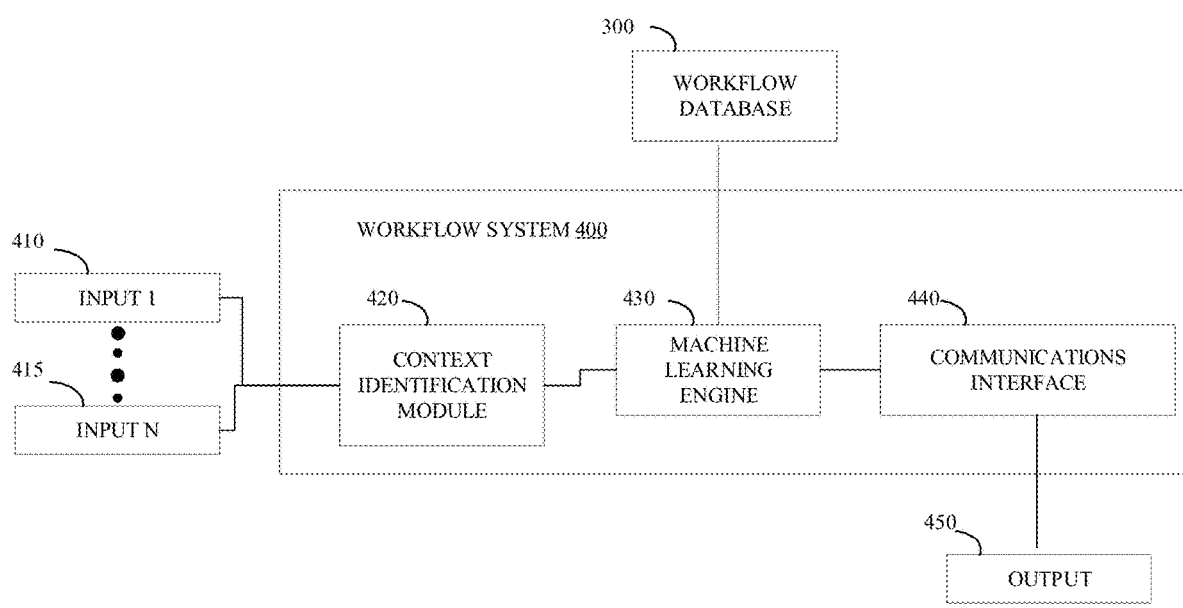
FIG. 4 illustrates a schematic block diagram of a workflow system for improving workflow performance, according to an example embodiment.

FIG. 4 illustrates a schematic block diagram of a workflow system 400 for improving workflow performance, according to an example embodiment. In some embodiments, with reference to FIG. 4, the workflow system 400 can include a context identification module 420, machine learning engine 430, and communications interface 440, all of which may be in communication with the workflow database 300. The workflow system 400 may receive one or more inputs or request (e.g., voice commands) and may generate an appropriate response. For instance, the workflow system 400 may generate voice prompts including instructions in form of voice commands for performing steps of a workflow operation. The workflow system 400 may use any of the algorithms or processes disclosed herein for receiving a request/input and generating a response. In some other embodiments, such as when the circuitry 200 is embodied in a server 160, supervisor device 150, and/or operator devices 110A-110N, the workflow system 400 may be located in another circuitry 200 or another device, such as another server 160, supervisor device 150, and/or operator devices 110A-110N. The workflow system 400 can be configured to access data corresponding to one or more employees, performance status, execution of tasks of one or more workflow operations, warehouse data, etc. and generate one or more responses and/or indications.

With reference to FIG. 4, whether used locally or over a network, the workflow system 400 may be used to analyze the workflow performance, identify contextual information based on voice dialogues of the operators, create suggestions/notifications associated with the tasks and subtasks, and notify supervisors or management as to the relevant tasks/subtasks and performance status associated with execution of the workflow by the operator. The system may receive a plurality of inputs 410, 415 from the circuitry 200 and process the inputs within the workflow system 400 to produce an output 450. In accordance with various example embodiments described herein, the output 450 can be indicative of a performance status associated with an execution of a task of the workflow. In other words, the output 450 can indicate a performance of execution the task of the workflow.

As described according to various example embodiments, each workflow activity can be performed based on a voice dialogue between the operator and the voice controlled apparatus 104 (i.e. based on an exchange of voice prompts and voice response). In this regard, according to said example embodiments, each step of the workflow can be pre-defined. Said differently, the workflow can include a set of predefined steps/tasks that are to be performed for completion of the workflow. As described earlier, instructions for performing each of these steps can be provided as voice prompts. Accordingly, there can be a fixed type/number of voice prompts according to a type of workflow (e.g., but not limited to, order picking workflow, cycle counting workflow, stock replenishment workflow etc.) and the voice responses expected for each of the voice prompt can also be pre-defined. To this end, each voice dialogue associated with a workflow can include one or more contextual keywords (or a group of words, phrase, and/or the like) that can be predefined for that workflow. Further, in some examples, a contextual word can be defined according to a context associated with that step of the workflow. For instance, an example of contextual keyword can be 'Location' which can be provided as a voice prompt to the operator to seek a current location of the operator. Similarly, another example of contextual keyword can be 'Ready' which can be provided as a voice response by the operator to indicate an affirmation in response to a voice prompt.

Furthermore, in accordance with various example embodiments described herein, a position of the contextual keyword in the voice dialogue, a timestamp of occurrence of the contextual keyword, a frequency of occurrence of the contextual keyword can be pre-defined for a workflow. For instance, as an example, for a workflow it can be known that a contextual word 'Line' should generally occur at a starting of the voice dialogue during an execution of the workflow. Similarly, as another example, the contextual keyword 'Ready' can be provided by the operator, at a pre-defined timestamp, or after a pre-defined time interval (e.g. within 10 seconds) subsequent to a particular voice prompt. According to another example, a contextual keyword can include a set of words (e.g. a three digit letter) that are provided one after another in a pre-defined sequence in a voice response. In another example, the contextual keyword can also include a set of words which occur in the voice dialogue in a defined pattern.

In accordance with various example embodiments described herein, the context identification module 420 can receive a data file including one or more voice dialogues as inputs (410, 415 . . . 41n). The context identification module 420 can parse the inputs (410, 415 . . . 41n) to identify the set of contextual keywords and/or contextual parameters (e.g. a position of the contextual keyword in the voice dialogue, a timestamp of occurrence of the contextual keyword, a frequency of occurrence of the contextual keyword etc.) associated with one or more of the contextual keyword. In this regard, in an example embodiments, the inputs (410, 415 . . . 41n) can be received in a log file of a voice dialogue, as an unstructured data from the workflow database 300. In some example embodiments, the context identification module 420 can identify the set of contextual keywords and/or associated contextual parameters by performing a frequency analysis while parsing the input voice dialogues. Further, the contextual keywords and/or contextual parameters (e.g. logical state associated with a contextual keyword, frequency of occurrence, frequency of repeating, timestamp and/or time period of occurrence the contextual keyword) can be stored in the workflow database 300 for training a machine learning model.

Further, in accordance with some example embodiments, when inputs 410, 415 are received by the workflow system 400, the context identification module 420 can determine other additional information indicative of context associated with the workflow. For instance, in some examples, the context identification module 420 can determine information such as, operator profile data (e.g., what employee is associated with the input 410, 415), operator historical performance data (e.g., how has the employee handled tasks associated with the input 410, 415 in the past), task data (e.g., what task is associated with the input 410, 415), preference data of the system, and what request or indication was received as the input 410, 415 etc. These inputs may give context to the workflow system's machine learning engine 430 to determine the output indicative of a performance status associated with execution of a task of the workflow operation.

In accordance with some example embodiments, one or more patterns in the contextual keywords and/or contextual parameters can be identified to train the machine learning model. In this regard, in some example embodiments, the machine learning engine 430 can convert the unstructured data of the data file into a structured data format representing a matrix comprising each of the contextual keyword from the voice dialogue in rows and its associated contextual parameters in columns. In accordance with various example embodiments described herein, the machine learning engine 430 can receive the structured data (i.e. the set of contextual keywords and/or associated contextual parameters), as input features. The machine learning engine 430 can generate a machine learning model that can be trained using the input features. In this regard, the machine learning engine 430 using the machine learning model can output a classification indicating the performance status associated with the execution of the task of the workflow.

According to some example embodiments, the machine learning engine 430 can employ a support vector machine (SVM) classifier to determine one or more classifications, one or more correlations, one or more expressions, one or more inferences, one or more patterns, one or more features and/or other learned information related to the input features (e.g. structured data outputted by the context identification module 420). In another example embodiment, the machine learning engine 430 can employ one or more machine learning classification techniques associated with a Bayesian machine learning network, a binary classification model, a multiclass classification model, a linear classifier model, a quadratic classifier model, a neural network model, a probabilistic classification model, decision trees and/or one or more other classification models. The machine learning model (e.g., the classification model, the machine learning classifier, etc.) employed by the machine learning engine 430 can be explicitly trained (e.g., via training data) and/or implicitly trained (e.g., via extrinsic data received by the machine learning model). For example, the machine learning model (e.g., the classification model, the machine learning classifier, etc.) employed by the machine learning engine 430 can be trained with training data (i.e. the input features) that includes the set of contextual keywords and/or contextual parameters associated with the contextual keywords.

According to various example embodiments described herein, the machine learning engine 402 can generate the machine learning model that can perform an analysis (e.g. a regression or a decision tree analysis) using: (a) the input features (i.e. the set of contextual keywords and/or contextual parameters identified from one or more historical voice dialogues) and (b) initial few instances of voice prompts and voice responses (referred herein as, a first voice prompt and a first voice response for purpose of brevity) of a current voice dialogue of an ongoing task of the workflow under execution to provide an output. According to some example embodiments, to generate the output, the machine learning engine 430 can identify a pattern associated with one or more of (a) contextual keywords, (b) the contextual parameters associated the contextual keywords, (c) initial instances of voice prompts of an ongoing task of the workflow, and (d) initial instances of voice responses of the ongoing task of the workflow.

As an example, an historical voice dialogue associated with the task of a workflow that can be provided as inputs (410, 415 . . . 41n) to the workflow system 400 can include multiple voice prompts including instructions for reaching a location in a warehouse and picking an item from that location. For instance, in an example, the voice prompts can be 'One Line, H U color is purple, check digit middle', 'bravo golf One Six alpha Zero Two', etc. Further, the voice dialogue can also include voice responses that can be provided by the operator in response to the voice prompts. In some examples, the voice responses can indicate any of, a confirmation, a data value, etc. indicative of performing of that step of the task of the workflow. For instance, in an example, the voice responses provide by the operator can include 'Location', 'ready', '8', '4' etc. In accordance various example embodiments described herein, the machine learning engine 430 by analyzing the voice dialogue can identify one or more patterns associated with the contextual keywords identified from the voice dialogue. Identification of the one or more patterns can be based on context associated with each step of the workflow. For example, the machine learning engine 430 can identify that the word 'One Line' usually is present at start of the voice prompt. In another example, the machine learning engine 430 can identify that the voice response 'Ready' is generally provided within 30 seconds of receiving a previous voice prompt by the operator. Another example pattern can be that the word 'Bravo' usually occurs three times during execution of the task of the workflow. Accordingly, the machine learning engine 430 can identify such patterns and use these patterns associated with the contextual keywords to train the machine learning model which can be used to generate the output. The output by the machine learning engine 430 can be related to a performance status associated with the execution of the ongoing task of the workflow. In this regard, the output of the machine learning model employed by the machine learning engine 430 can indicate a progress (e.g. a normal operation, a delayed operation, an incorrect operation) of the execution of the task. In some examples, the output of the machine learning engine 430 can be a classification indicative of a progress of the execution of the task of the workflow. As an example, for an item picking operation, the output of the machine learning engine 430 can be indicative of a classification such as, a normal picking, delayed picking, an incorrect picking etc.

Further, as described earlier, the machine learning engine 430 can identify the performance status during a course of execution of the task of the workflow and before completion. Further, in response to identification of the performance status, the machine learning engine 430 can also output a suggestion that can be implemented by the operator to improve the performance status associated with the execution of the task of the workflow. In some examples, the suggestions can be provided to the operator depending on a step or a task at which the operator is facing an issue in moving ahead with the execution of the workflow.

Figure 5:
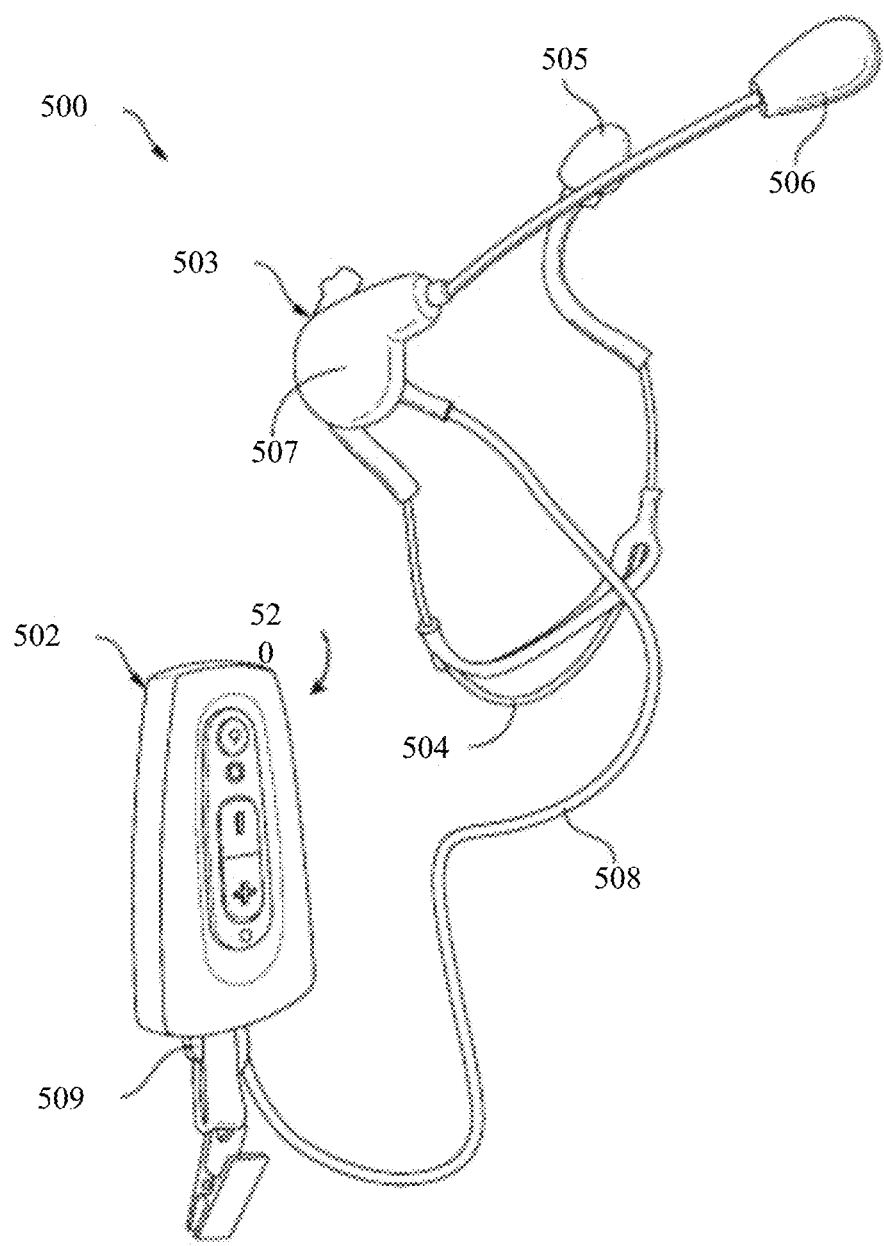
FIG. 5 illustrates an exemplary voice controlled apparatus used for performing a workflow operation, according to an example embodiment.

FIG. 5 illustrates an exemplary voice controlled apparatus 500 according to an example embodiment. In the embodiment illustrated in FIG. 5, the voice controlled apparatus 500 can correspond to a headset that can include a wireless enabled voice recognition device that utilizes a hands-free profile.

In accordance with some example embodiments, the headset may be substantially similar to the headset disclosed in U.S. Provisional Patent Application No. 62/097,480 filed Dec. 29, 2014, U.S. Provisional Patent Application No. 62/101,568, filed Jan. 9, 2015, and U.S. patent application Ser. No. 14/918,969, and the disclosures therein are hereby incorporated by reference in their entireties.

In accordance with an example embodiment, as illustrated, the voice controlled apparatus 500 can include an electronic module 502. In this embodiment, some elements can be incorporated into an electronics module 502 rather than the headset 503, to provide a long battery life consistent with long work shifts. As an example, one or more components of circuitry 200 may be incorporated in the electronic module 502 and/or the headset 503. In some example embodiments, the electronics module 502 can be remotely coupled to a light-weight and comfortable headset 503 secured to a worker head via a headband 504. In some example embodiments, the headband 504 can be a band that is designed to fit on a worker's head, in an ear, over an ear, or otherwise designed to support the headset. The headset 503 can include one or more speakers 505 and can further include one or more microphones. For instance, in the embodiment illustrated in FIG. 5, the headset 503 includes microphones 506, 507. According to some example embodiments, the microphone 507 can provide for noise cancellation by continuously listening to and blocking environmental sounds to enhance voice recognition and optionally provide for noise cancellation. In some embodiments (not shown), the electronics module 502 can be integrated into the headset 503 rather than being remotely coupled to the headset 503. Various configurations of the voice controlled apparatus 500 can be used without deviating from the intent of the present disclosure.

In some example embodiments, the electronics module 502 can be used to offload several components of the headset 503 to reduce the weight of the headset 503. In some embodiments, one or more of a rechargeable or long life battery, display, keypad, Bluetooth® antenna, and printed circuit board assembly (PCBA) electronics can be included in the electronics module 502 and/or otherwise incorporated into the voice controlled apparatus 500.

In the embodiment illustrated in FIG. 5, the headset 503 can be coupled to the electronics module 502 via a communication link such as a small audio cable 508 but could instead communicate with the electronics module 502 via a wireless link. In an example embodiment, the headset 503 can be of a low profile. For instance, headset 503 can be minimalistic in appearance in some embodiments, such as a Bluetooth earpiece/headphone. According to some example embodiments the electronics module 502 can be configured to be used with various types of headsets 503. In some example embodiments, the electronics module 502 can read a unique identifier (I.D.) of the headset 503, which can be stored in the circuitry of the voice controlled apparatus 500 (e.g., the circuitry 200) and can also be used to electronically couple the speakers and microphones to electronics module 502. In one embodiment, the audio cable 508 can includes multiple conductors or communication lines for signals which can include a speaker+, speaker−, ground digital, microphone, secondary microphone, and microphone ground. In some examples, the electronics module 502 can utilize a user configurable attachment 509, such as a plastic loop, to attach to a user. For instance, in the embodiment illustrated in FIG. 5, the electronics module 502 can be mounted to a worker torso via a lapel clip and/or lanyard. In some embodiments, the headset 503 can include a small lightweight battery, such as when a wireless link between the headset 503 and electronics module 502 can be used, such as Bluetooth type of communication link. The communication link can provide wireless signals suitable for exchanging voice communications.

In some embodiments, voice templates for performing a speaker dependent training of a speech recognition model can be stored locally in the electronic module 502 and/or the headset 503 as part of the circuitry 200 to recognize a user's voice interactions and may convert the interaction into text based data and commands for interaction with an application running in the circuitry 200. For example, the voice controlled apparatus 500 can perform voice recognition in one embodiment utilizing the voice templates. According to some example embodiments, first few stages of voice recognition can be performed in the voice controlled apparatus 500, with further stages performed on a server 160. In further embodiments, raw audio can be transmitted from voice controlled apparatus 500 to the server 160 where the final stages of voice recognition can be completed. Alternatively, in some example embodiments, the voice recognition can be performed on the voice controlled apparatus 500.

Figure 6:
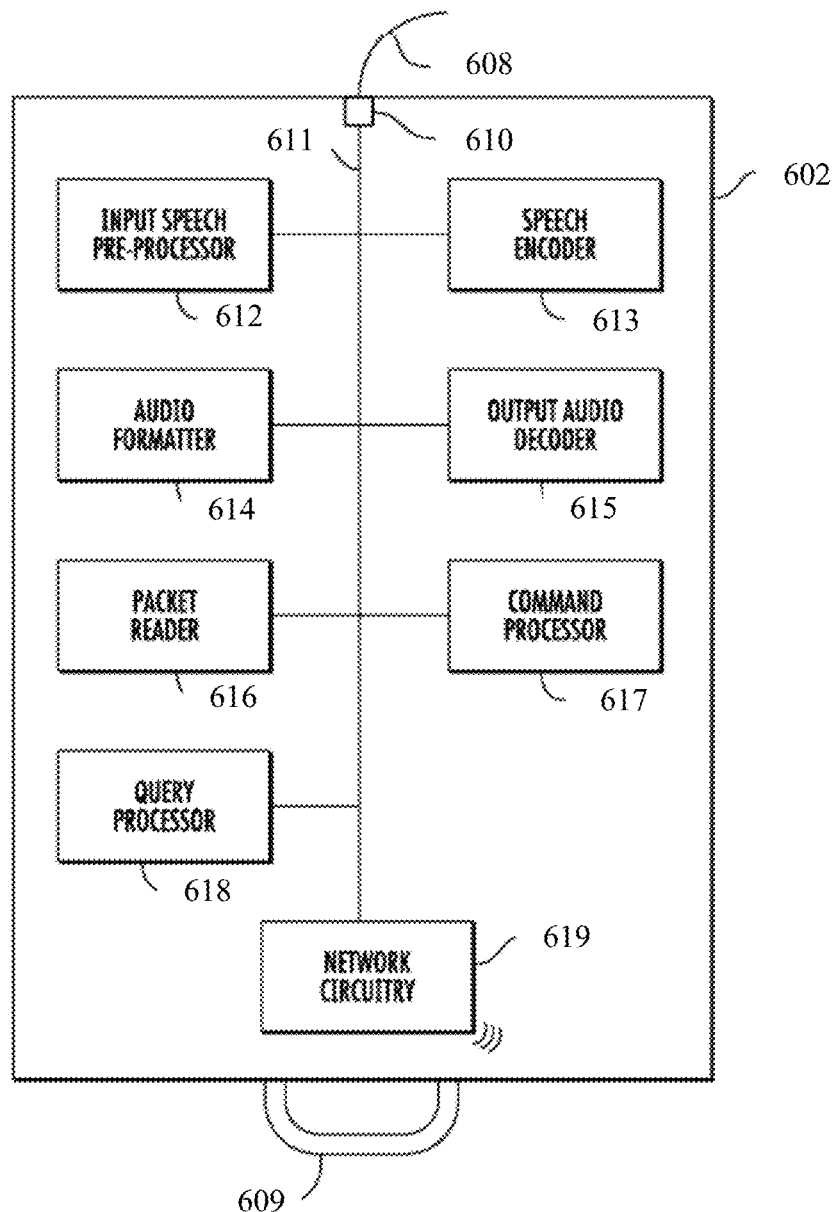
FIG. 6 illustrates a block diagram of the voice controlled apparatus used for performing a workflow operation, in accordance with an example embodiment.

FIG. 6 illustrates an exemplary block diagram of an electronics module 502 in accordance with some embodiments of the present disclosure. The components illustrated in FIG. 6 may be in addition to one or more components of the circuitry 200 shown in FIG. 2, which may be part of the electronics module 502. In some embodiments, one or more of the components illustrated in FIG. 6 may be included in the electronics module 502 and/or other parts of the voice controlled apparatus (500, 104), the electronic device 102, operator devices 110A-110N, supervisor device 150, and/or server 160.

In the embodiment shown in FIG. 6, the electronics module 502 can include an enclosure, such as plastic case, with a connector 510 that can mate with a complimentary mating connector (not shown) on audio cable 508. An internal path 511 can be used to communicate between multiple components within the electronics module 502 enclosure. In one embodiment, an input speech pre-processor (ISPP) 512 can convert input speech into pre-processed speech feature data. In some examples, an input speech encoder (ISENC) 513 can encode input speech for transmission to one or more other parts of circuitry 200 for reconstruction and playback and/or recording. Further, a raw input audio sample packet formatter 514 can transmit the raw input audio to one or more other parts of circuitry 200 using an application-layer protocol to facilitate communications between the voice terminal and headset 503 as the transport mechanism. For the purposes of the transport mechanism, the formatter 514 can be abstracted to a codec type referred to as Input Audio Sample Data (IASD). An output audio decoder (OADEC) 515 decodes encoded output speech and audio for playback in the headset 503. According to some example embodiments, a raw output audio sample packet reader 516 can operates to receive raw audio packets from one or more other parts of circuitry 200 using the transport mechanism. For the purposes of the transport mechanism, this formatter 514 can be abstracted to a codec type referred to as Output Audio Sample Data (OASD). A command processor 517 can adjusts the headset hardware (e.g., input hardware gain level) under control of one or more other parts of circuitry 200. Further, in some example embodiments, a query processor 518 can allow one or more other parts of circuitry 200 to retrieve information regarding headset operational status and configuration. Further, path 511 can also be coupled to network circuitry 519 to communicate via wired or wireless protocol with one or more other parts of circuitry 200. In some examples, the ISPP 512, ISENC 513, and raw input audio formatter 514 can be sources of communication packets used in the transport mechanism; the OADEC 515 and raw output audio reader 516 can be packet sinks. The command and query processors 517, 518 are both packet sinks as well as sources (in general they generate acknowledgement or response packets).

Figure 7:
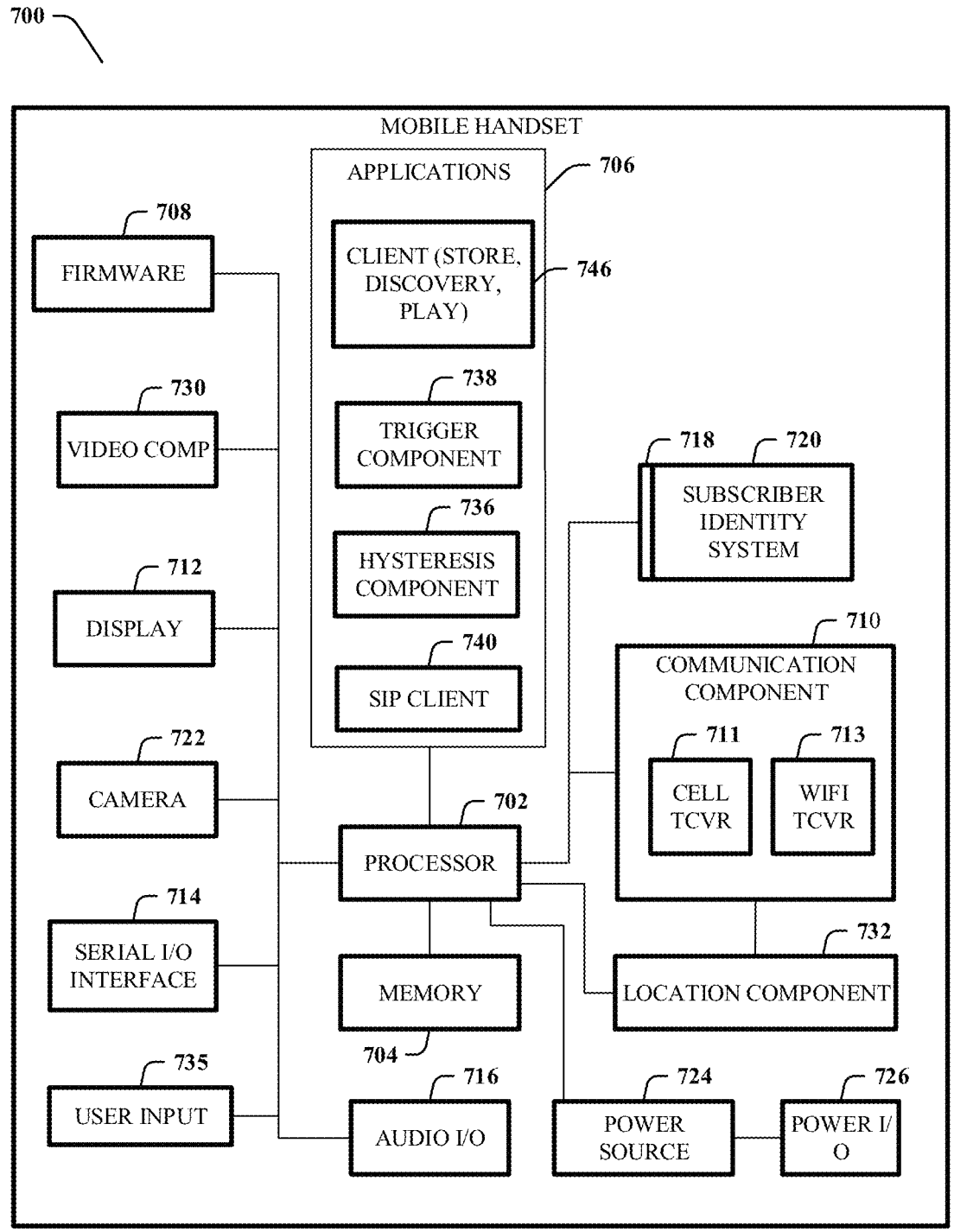
FIG. 7 illustrates a schematic view of an example electronic device used for performing a workflow operation, in accordance with an example embodiment.

FIG. 7 illustrates a schematic view 700 of an example electronic device (e.g. the electronic device 102, the operator devices 110A-110N, the supervisor device 150 etc.), in accordance with an example embodiment described herein. In some example embodiments, the electronic device 102 can correspond to a mobile handset. FIG. 7 illustrates is a schematic block diagram of an example end-user device such as a user equipment that can be the electronic device 102 used by an operator for executing one or more tasks of a workflow.

Although, FIG. 7 illustrates a mobile handset, it will be understood that other devices can be any electronic device as described in FIG. 1, and that the mobile handset is merely illustrated to provide context for the embodiments of the various embodiments described herein. To this end, the following discussion is intended to provide a brief, general description of an example of a suitable environment in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., described herein in accordance with example embodiments, that can perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

According to some example embodiments, the electronic device 102, the operator devices 110A-110N, and the voice controlled apparatus 104 can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

According to some example embodiments described herein, a communication media typically embodies computer-readable instructions, data structures, program modules or other data in a modulated data signal such as a carrier wave or other transport mechanism and includes any information delivery media. In this regard, the term "modulated data signal" can correspond to a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

According to some example embodiments, the mobile handset can comprise a processor 702 for controlling and processing all onboard operations and functions. A memory 704 interfaces to the processor 702 for storage of data and one or more applications 706 (e.g., a video player software, user feedback component software, etc.). Other applications can include voice recognition of predetermined voice commands that facilitate initiation of the user feedback signals. The applications 706 can be stored in the memory 704 and/or in a firmware 708 and executed by the processor 702 from either or both the memory 704 or/and the firmware 708. The firmware 708 can also store startup code for execution in initializing the mobile handset. A communications component 710 interfaces to the processor 702 to facilitate wired/wireless communication with external systems, e.g., cellular networks, VoIP networks, and so on. Here, the communications component 710 can also include a suitable cellular transceiver 711 (e.g., a GSM transceiver) and/or an unlicensed transceiver 713 (e.g., Wi-Fi, WiMAX) for corresponding signal communications. The mobile handset can be a device such as a cellular telephone, a PDA with mobile communications capabilities, and messaging-centric devices. The communications component 710 also facilitates communications reception from terrestrial radio networks (e.g., broadcast), digital satellite radio networks, and Internet-based radio services networks.

The mobile handset can also comprise a display 712 (e.g. display screen) for displaying text, images, video, telephony functions (e.g., a Caller ID function), setup functions, and for user input. For example, the display 712 can also be referred to as a "screen" that can accommodate the presentation of multimedia content (e.g., music metadata, messages, wallpaper, graphics, etc.). The display 712 can also display videos and can facilitate the generation, editing and sharing of video quotes. A serial I/O interface 714 is provided in communication with the processor 702 to facilitate wired and/or wireless serial communications (e.g., USB, and/or IEEE 1384) through a hardwire connection, and other serial input devices (e.g., a keyboard, keypad, and mouse). This support updating and troubleshooting the mobile handset, for example. Audio capabilities are provided with an audio I/O component 716, which can include a speaker for the output of audio signals related to, for example, indication that the user pressed the proper key or key combination to initiate the user feedback signal. The audio I/O component 716 also facilitates the input of audio signals through a microphone to record data and/or telephony voice data, and for inputting voice signals for telephone conversations.

The mobile handset can also comprise a slot interface 718 for accommodating a SIC (Subscriber Identity Component) in the form factor of a card Subscriber Identity Module (SIM) or universal SIM 720 and interfacing the SIM card 720 with the processor 702. However, it is to be appreciated that the SIM card 720 can be manufactured into the mobile handset and updated by downloading data and software.

The mobile handset can also process IP data traffic through the communication component 710 to accommodate IP traffic from an IP network such as, for example, the Internet, a corporate intranet, a home network, a person area network, etc., through an ISP or broadband cable provider. Thus, VoIP traffic can be utilized by the mobile handset and IP-based multimedia content can be received in either an encoded or decoded format.

A video processing component 722 (e.g., a camera) can be provided for decoding encoded multimedia content. The video processing component 822 can aid in facilitating the generation, editing and sharing of video quotes. The mobile handset also includes a power source 724 in the form of batteries and/or an AC power subsystem, which power source 724 can interface to an external power system or charging equipment (not shown) by a power I/O component 726.

According to some example embodiments, the mobile handset can also comprise a video component 730 for processing video content received and, for recording and transmitting video content. For example, the video component 730 can facilitate the generation, editing and sharing of video quotes. In some example embodiments, a location tracking component 732 facilitates geographically locating the mobile handset. As described hereinabove, this can occur when the user initiates the feedback signal automatically or manually. According to some example embodiments, a user input component 734 facilitates the user initiating the quality feedback signal. In this regard, in some examples, the user input component 734 can also facilitate the generation, editing and sharing of video quotes. According to various example embodiments described herein, the user input component 734 can include such conventional input device technologies such as a keypad, keyboard, mouse, stylus pen, and/or touch screen, for example.

Referring again to the applications 706, a hysteresis component 736 can facilitate the analysis and processing of hysteresis data, which is utilized to determine when to associate with the access point. A software trigger component 838 can be provided that facilitates triggering of the hysteresis component 738 when the Wi-Fi transceiver 713 detects the beacon of the access point. A SIP client 740 enables the mobile handset to support SIP protocols and register the subscriber with the SIP registrar server. In some example embodiments, the applications 706 can also include a client 742 that provides at least the capability of discovery, play and store of multimedia content, for example, music.

In some example embodiments, the mobile handset, as indicated above related to the communications component 710, includes an indoor network radio transceiver 713 (e.g., Wi-Fi transceiver). This function can support the indoor radio link, such as IEEE 802.11, for the dual-mode GSM handset. In some example embodiments, the mobile handset can accommodate at least satellite radio services through a handset that can combine wireless voice and digital radio chipsets into a single handheld device.

Figure 8:
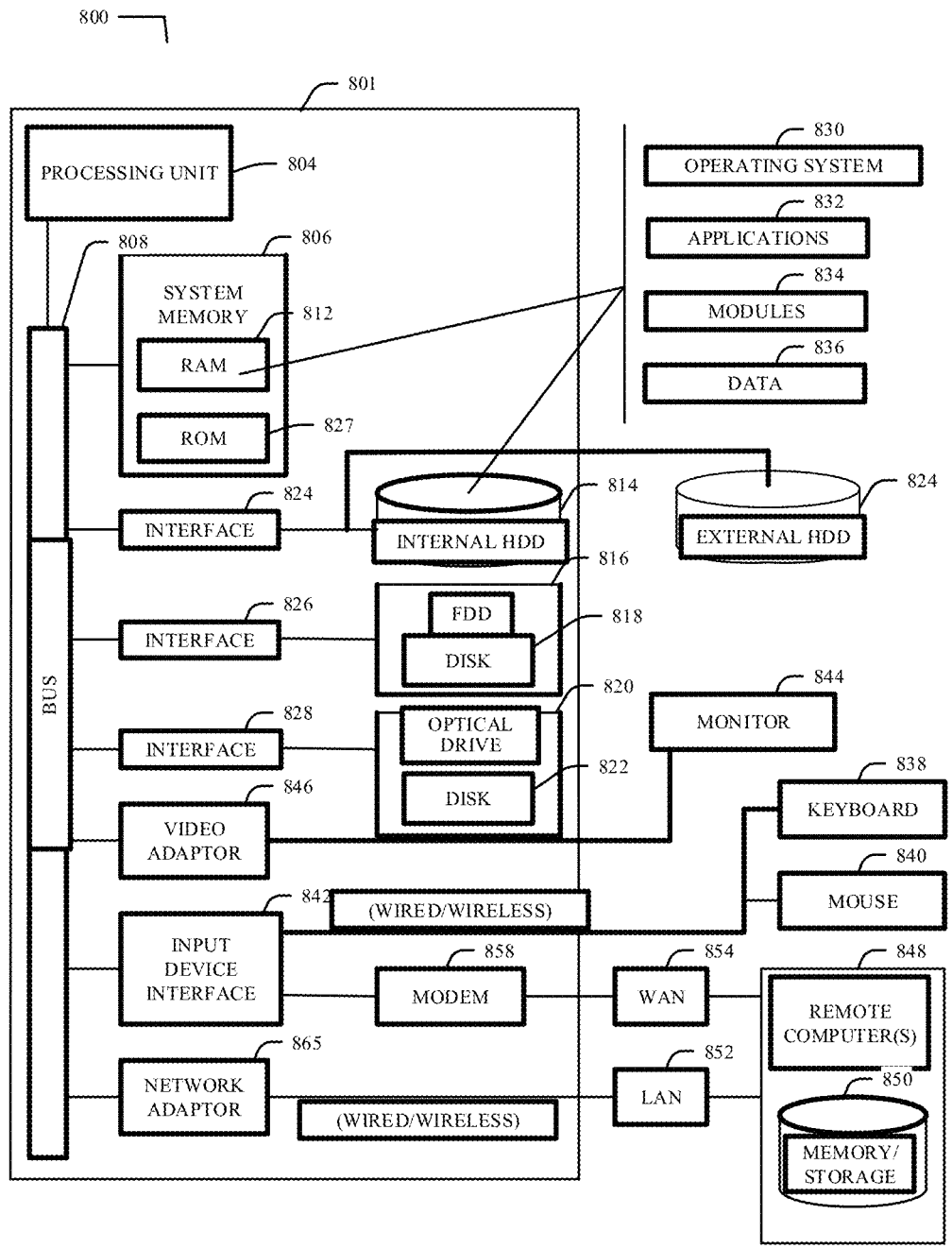
FIG. 8 illustrates a schematic view of another example electronic device used for performing a workflow operation, in accordance with another example embodiment.

FIG. 8 illustrates a schematic view of another example of an electronic device 801, in accordance with another example embodiment described herein. According to some example embodiments, the electronic device 801 illustrated in FIG. 8 can correspond to the electronic device 102, the operator devices 110A-110N, the supervisor device 150, and/or the server 160, as described in reference to FIGS. 1-7.

Referring now to FIG. 8, there is illustrated a block diagram of operable to execute the functions and operations performed in the described example embodiments. In some example embodiments, the electronic device 801 can provide networking and communication capabilities between a wired or wireless communication network and a server and/or communication device. In order to provide additional context for various aspects thereof, FIG. 8 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

According to said example embodiments, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, mini-computers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

In accordance with some example embodiments, computing devices typically include a variety of media, which can include computer-readable storage media or communications media, which two terms are used herein differently from one another as follows.

According to some example embodiments, a computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

In some examples, communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 8, implementing various aspects described herein with regards to the end-user device can comprise the electronic device 801 comprising a processing unit 804, a system memory 806 and a system bus 808. The system bus 808 can be configured to couple system components including, but not limited to, the system memory 806 to the processing unit 804. In some example embodiments, the processing unit 804 can be any of various commercially available processors. To this end, in some examples, dual microprocessors and other multi-processor architectures can also be employed as the processing unit 804.

According to some example embodiments, the system bus 808 can be any of several types of bus structure that can further interconnect to a memory bus (with or without a memory controller), a peripheral bus, and a local bus using any of a variety of commercially available bus architectures. In some examples, the system memory 806 can comprise, read-only memory (ROM) 827 and random-access memory (RAM) 812. According to some example embodiments, a basic input/output system (BIOS) is stored in a non-volatile memory 827 such as ROM, EPROM, EEPROM, which BIOS contains the basic routines that help to transfer information between elements within the computing device 801, such as during start-up. The RAM 812 can also comprise a high-speed RAM such as static RAM for caching data.

According to some example embodiments, the computing device 801 can further comprise an internal hard disk drive (HDD) 814 (e.g., EIDE, SATA), which internal hard disk drive 814 can also be configured for external use in a suitable chassis (not shown), a magnetic floppy disk drive (FDD) 816, (e.g., to read from or write to a removable diskette 818) and an optical disk drive 820, (e.g., reading a CD-ROM disk or, to read from or write to other high capacity optical media such as the DVD). In some examples, the hard disk drive 814, magnetic disk drive 816 and optical disk drive 820 can be connected to the system bus 808 by a hard disk drive interface 824, a magnetic disk drive interface 826 and an optical drive interface 828, respectively. According to some example embodiments, the interface 824 for external drive implementations can comprise, at least one or both of Universal Serial Bus (USB) and IEEE 1394 interface technologies. Other external drive connection technologies are within contemplation of the subject embodiments.

According to some example embodiments described herein, the drives and their associated computer-readable media provide nonvolatile storage of data, data structures, computer-executable instructions, and so forth. For the electronic device 801 the drives and media accommodate the storage of any data in a suitable digital format. Although the description of computer-readable media above refers to a HDD, a removable magnetic diskette, and a removable optical media such as a CD or DVD, it may be appreciated by those skilled in the art that other types of media which are readable by an electronic device 801, such as zip drives, magnetic cassettes, flash memory cards, cartridges, and the like, can also be used in the example operating environment, and further, that any such media can contain computer-executable instructions for performing the methods of the disclosed embodiments.

In some example embodiments, a number of program modules can be stored in the drives and RAM 812, including an operating system 830, one or more application programs 832, other program modules 834 and program data 836. To this end, in some examples, all or portions of the operating system, applications, modules, and/or data can also be cached in the RAM 812. It is to be appreciated that the various embodiments can be implemented with various commercially available operating systems or combinations of operating systems.

According to some example embodiments, a user can enter commands and information into the computing device 801 through one or more wired/wireless input devices, e.g., a keyboard and a pointing device, such as a mouse 840. Other input devices (not shown) may include a microphone, an IR remote control, a joystick, a game pad, a stylus pen, touch screen, or the like. In some examples, these and other input devices are often connected to the processing unit 804 through an input device interface 842 that is coupled to the system bus 808, but can be connected by other interfaces, such as a parallel port, an IEEE 1384 serial port, a game port, a USB port, an IR interface, etc.

According to some example embodiments, a monitor 844 or other type of display device can also be connected to the system bus 808 through an interface, such as a video adapter 846. In addition to the monitor 844, the computing device 801 can also comprise other peripheral output devices (not shown), such as speakers, printers, etc.

According to some example embodiments, the computing device 801 can operate in a networked environment using logical connections by wired and/or wireless communications to one or more remote computers, such as a remote computer(s) 848. In some examples, the remote computer(s) 848 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 850 is illustrated. According to some example embodiments, the logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

In some examples, when used in a LAN networking environment, the computing device 801 can be connected to the LAN 852 through a wired and/or wireless communication network interface or adapter 856. The adapter 856 may facilitate wired or wireless communication to the LAN 852, which may also include a wireless access point disposed thereon for communicating with the wireless adapter 856.

In alternate examples, when used in a WAN networking environment, the computing device 801 can include a modem 858, or can be connected to a communications server on the WAN 854 or has other means for establishing communications over the WAN 854, such as by way of the Internet. The modem 858, which can be internal or external and a wired or wireless device, is connected to the system bus 808 through the input device interface 842. In a networked environment, program modules depicted relative to the computer, or portions thereof, can be stored in the remote memory/storage device 850. It will be appreciated that the network connections shown are exemplary and other means of establishing a communications link between the computers can be used.

According to some example embodiments, the computing device 801 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can further comprise at least Wi-Fi and Bluetooth™ wireless technologies. Thus, the communication can be a predefined structure as with a conventional network or simply an ad hoc communication between at least two devices.

In accordance with some example embodiments, Wi-Fi, or Wireless Fidelity, allows connection to the Internet from a couch at home, a bed in a hotel room, or a conference room at work, without wires. To this end, Wi-Fi referred herein, is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. Further, in accordance with some example embodiments described herein, a Wi-Fi network can be used to connect computers or the plurality of electronic devices 102-10N to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "9BaseT" wired Ethernet networks used in many offices.

Figure 9:
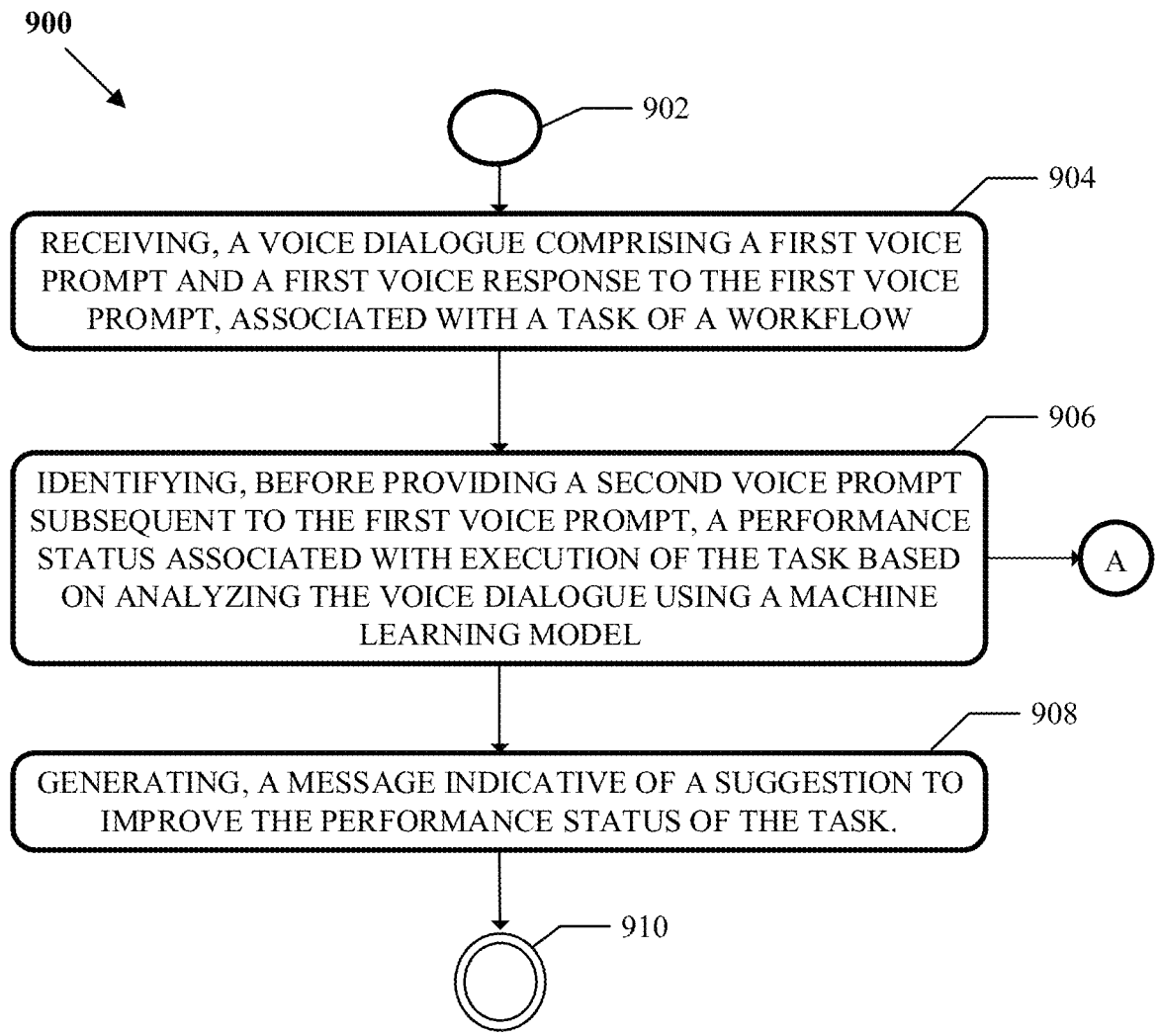
FIG. 9 illustrates a flow diagram representing a method for improving performance of executing a workflow operation, in accordance with an example embodiment.
Figure 10:
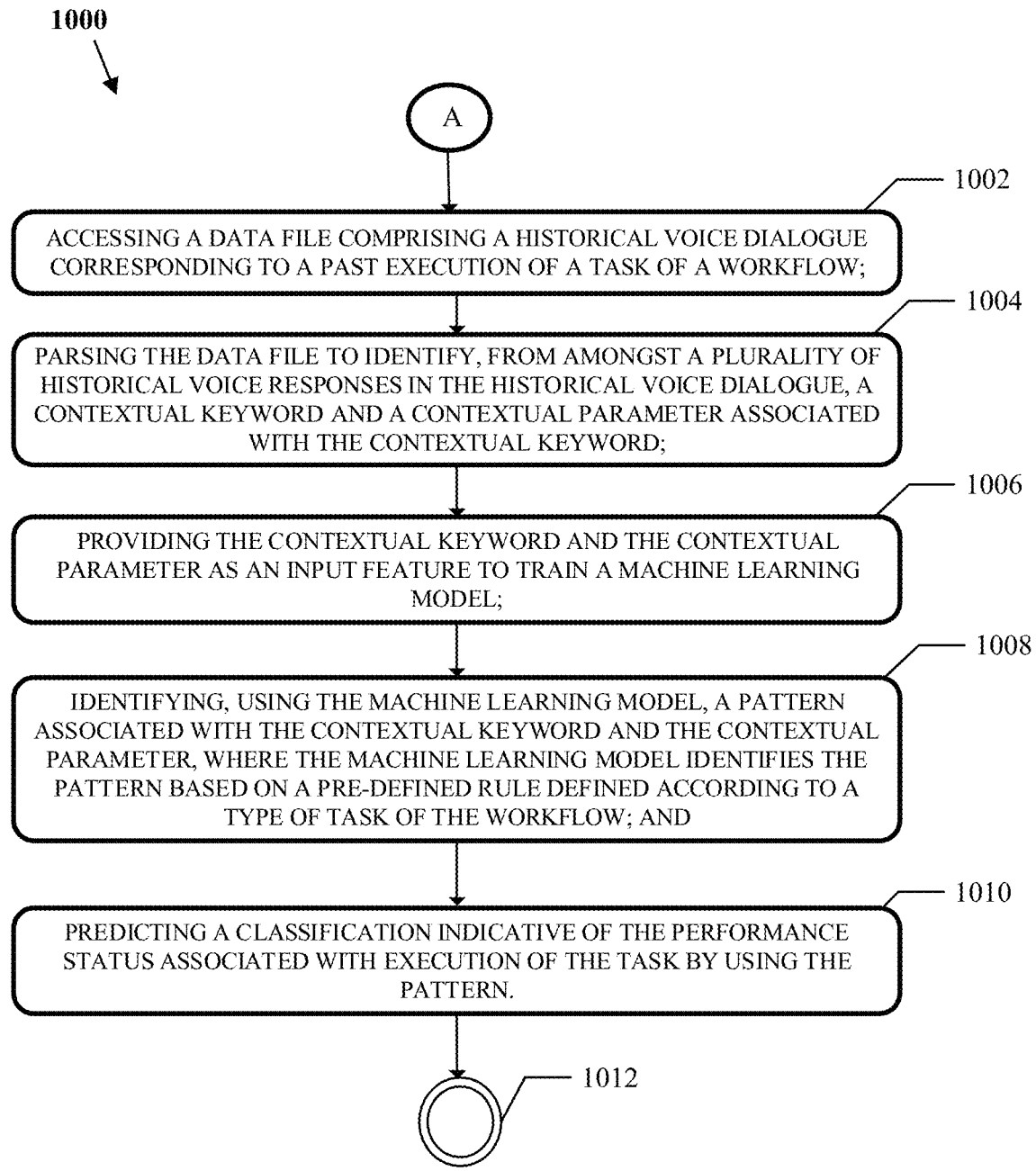
FIG. 10 illustrates a flow chart representing a method for identifying a performance status associated with an execution of a workflow operation, in accordance with an example embodiment.
Figure 11:
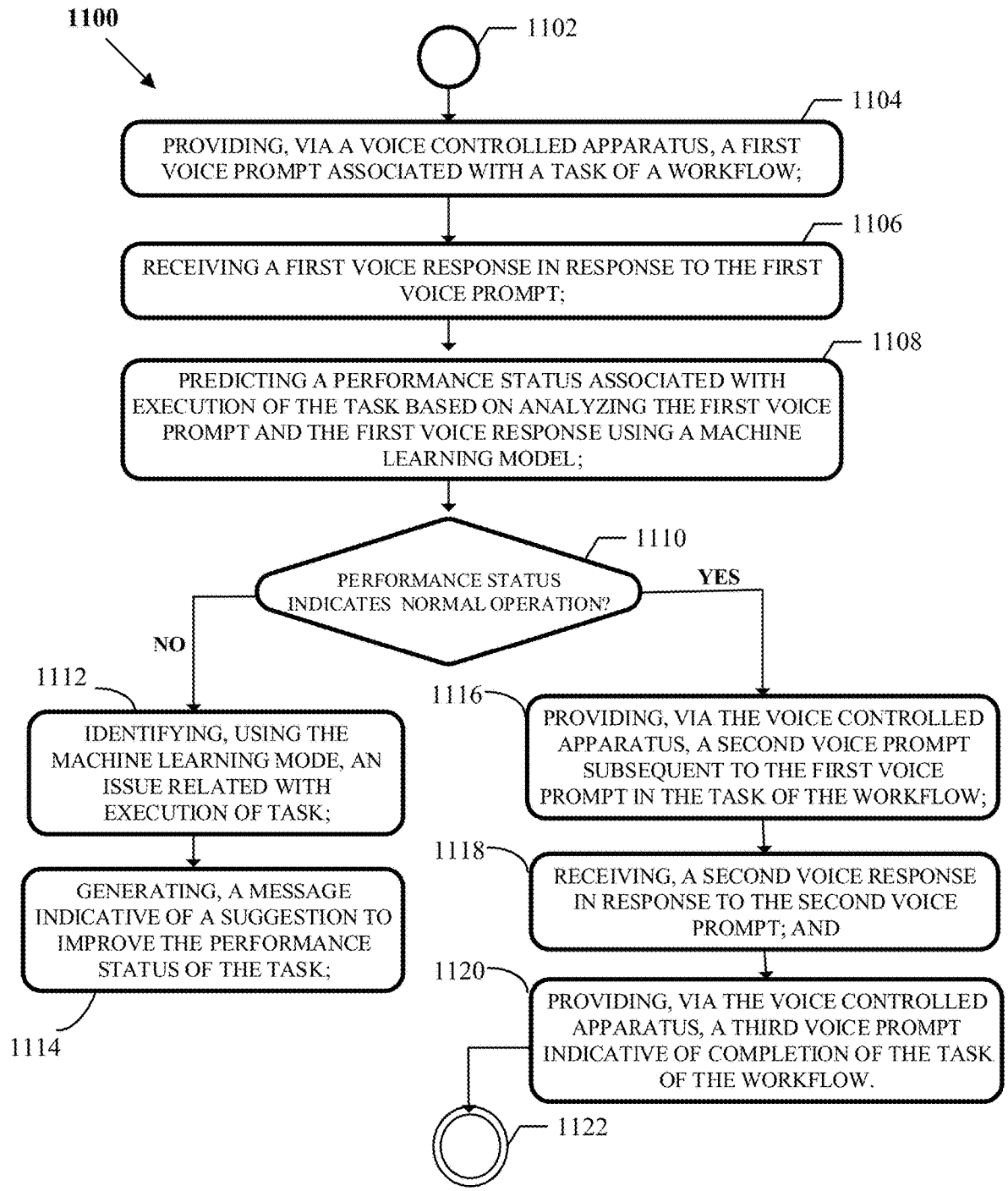
FIG. 11 illustrates a flow diagram representing a method for providing a suggestion to improve a performance of a worker in executing a workflow operation, in accordance with an example embodiment.

FIGS. 9-11 illustrate example flowcharts of the operations performed by an apparatus, such as any of the operator devices (102, 104, 110A-110N of FIG. 1 and/or server 160 of FIG. 1, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 9-11 when executed, convert a computer or processing circuitry into a particular machine configured to perform an example embodiment of the present invention. Accordingly, the operations of FIGS. 9-11 define an algorithm for configuring a computer or processor, to perform an example embodiment. In some cases, a general purpose computer may be provided with an instance of the processor which performs the algorithm of FIGS. 9-11 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

FIG. 9 illustrates a flow diagram representing a method 900 for improving performance of executing a workflow operation, in accordance with an example embodiment.

The method 900 starts at step 902. At step 904, any of the operator devices 110A-110N and/or the server 160 may comprise means such as, a communications module 240, to receive a voice dialogue associated with a task of a workflow (e.g., but not limited to, an item picking workflow, a cycle counting workflow etc.). The voice dialogue may include a first voice prompt and a first voice response. The first voice response may be provided by the operator in response to the first voice prompt. As described earlier, the voice dialogue can represent a sequence of (a) voice prompts that can be generated to provide instructions to the operators and (b) voice responses that can be provided by the operators to the respective voice prompts. Said differently, the voice prompts can include machine generated instructions (e.g. spoken instructions, voice commands, visual instructions etc.) that can be provided to the operators on the operator devices 110A-110N which can be used by the respective operators to perform one or more tasks of the workflow. Further, the voice responses can include responses provided by the operators to in response to respective voice prompts.

At step 906, any of the operator devices 110A-110N and/or the server 160 may comprise means such as the processor 210, to identify a performance status associated with execution of the task of the workflow. According to the example embodiment, the performance status can be identified before providing a second voice prompt subsequent to the first voice prompt. In other words, the performance status identified, in near real-time, within sometime of the providing of the first voice response to the first voice prompt and before providing the second voice prompt to the operator. The processor can identify the performance status based on analyzing the voice dialogue using the machine learning model, as described earlier in reference to FIG. 4. Further details of identification of the performance status are also described in reference to FIG. 10.

According to some example embodiments described herein, the performance status can be indicative of a progress and/or performance related to the execution of the task of the workflow. For instance, in an example, the performance status can indicate if the task and/or the workflow can be performed within an expected time or would be delayed/not completed within the expected time. Alternatively, and/or additionally, in another example, the performance status can indicate if the task and/or the workflow can be performed at an expected quality. In accordance with some example embodiments, the performance status can be indicative of at least one of, (a) an anticipated delay in execution of the task of the workflow, (b) an incorrect execution of the task of the workflow, and/or (c) a co-ordination gap corresponding to the first voice prompt and the first voice response. In some examples, the co-ordination gap corresponding to the first voice prompt and the first voice response can be due to an unexpected response to a voice prompt provided by the operator. In other words, the coordination gap can indicate a situation in which the voice response provided by the operator is not as per an expected voice response.

As an example, the task of the workflow can correspond to an item picking operation where the operator has to pick items (e.g. packages, shipments, products, and/or the like) from various storage locations within an industrial environment (e.g. a warehouse or inventory). In such a scenario, the performance status identified based on the voice dialogue can indicate a slow picking or a normal picking, execution of a picking task performed by the operator. For instance, if time taken to pick the item is slower than an expected time to pick the item, the performance status can indicate a slow picking performed by the operator. Accordingly, in an instance, in which the time taken to pick the item is as per the expected time to pick the item, the performance status identified based on the voice dialogue can indicate a normal picking execution of the picking task. In this regard, the performance status in this scenario (i.e. slow picking and/or normal picking) can be identified, in near-real time, during a course of execution of the picking workflow activity i.e. based on an initial exchange of voice prompts and/or voice responses related to the picking workflow activity and before complete execution of the picking workflow activity.

At step 908, the any of the operator devices 110A-110N and/or the server 160 may comprise means such as, the processor 210, to generate a message indicative of a suggestion to improve the performance status of the task. According to some example embodiments, the message may be generated before providing the second voice prompt to the operator. According to an example embodiment, the message may be generated in form of a voice prompt itself before generating the second voice prompt associated with a next instruction for the operator. In another example embodiment, the message may be generated as a visual instruction on a display screen of an electronic device (e.g. the operator devices 102, 110A-110N). In some example embodiments, the message indicative of suggestion to improve the performance status can be provided after completion of the execution of the task of the workflow (e.g., but not limited to, in an offline manner by a supervisor to the operators).

In accordance with some example embodiments, the suggestion provided at step 908, may correspond to an activity that can be performed by the operator and/or the supervisor to improve the performance status of the execution of the task of the workflow. As an example, the suggestion can indicate an activity that can be performed by the operator to cause efficient or faster execution of the task of the workflow. For instance, in an example, the suggestion can be indicative of an option to re-assign the task of the workflow to from the operator to another operator (i.e. an operator that may be more skilled to execute the task). In another example, in a situation where the task is of a picking workflow to pick items, the suggestion can indicate a correct location for picking an item. Similarly, in another example, the suggestion can indicate a correct destination for placing an item. In some example embodiments, the suggestion can also indicate a route for reaching an item picking location or an item placement destination.

In some other example embodiments, the suggestion can indicate an activity that can be performed to improve a speech recognition for the voice responses provided by the respective operators on the operator devices (102, 104, 110A-110N) used by the operators. For instance, in an example, the suggestion can indicate a requirement of re-training a speech recognition model used by the operator devices (102, 104, 110A-110N) to recognize voice responses provided by the operators. It may be understood that in some example situations, the voice responses provided by the operators may not be recognized by the operator devices (102, 104, 110A-110N) due to presence of background noise in the work environment, thereby impacting the performance status (for e.g. resulting in delayed execution of the task). In this regard, in an example, the suggestion can be indicative of retraining the speech recognition model according to a level of noise in a work environment. Further, in another example embodiment, the suggestion can be indicative of retraining the speech recognition model according to a speaker dependent voice template of the operator performing the task of the workflow. Furthermore, in some example embodiments, the suggestion can be indicative of a new task or a new workflow that can be preferred for an operator (e.g. according to a skill level or competency of the operator).

Accordingly, by way of implementation of various example embodiments described herein, the operator devices (102, 104, 110A-110N) can include means such as, the processor 210 to: (a) identify the performance status, in near real time (i.e. during execution of the task of the workflow) based on analysis of an ongoing voice dialogue (i.e. a current voice prompt and a current voice response) and (b) provide suggestions that can improve the performance status of the workflow. In this aspect, in some examples, the suggestions can be provided 'on the go' i.e. during the execution of the task of the workflow. Alternatively, and/or additionally, in some examples, the suggestions can be provided offline (e.g. by the supervisor) after the operator has performed the task of the workflow. The method 900 stops at step 910.

FIG. 10 illustrates a flow chart representing a method 1000 for identifying a performance status associated with an execution of a workflow operation, in accordance with an example embodiment. In some example embodiments, the method 1000 can be performed by any of the devices (102, 104, 110A-110N, 150, 160) as described earlier in reference to FIG. 1. According to some example embodiments, the method 1000 can be performed by the workflow system 400, as described in reference to FIG. 4. The method 1000 starts at step 1002.

According to some example embodiments, the method 1000 can start in response to initiation of an execution of a task of a workflow. For instance, as illustrated by connector labelled 'A', in some example embodiments, the method 1000 can start in response to receiving of a voice dialogue including at least a first voice prompt and a first voice response associated with the task of the workflow. In other words, the method 1000 can start after exchange of initial few voice prompts and voice responses, upon initiating the execution of the task of the workflow. Alternatively, and/or additionally, in some example embodiments, the method 1000 can start upon execution of a predefined step of the task of the workflow. For instance, in an example embodiment, the method 1000 can start in response to identification of a 'trigger word' that can initiate the method 1000. The trigger word can be defined based on a context associated with the task of the workflow. As an example, the trigger word could be 'Ready' that can be provided as a voice response by the operator. In another example, the trigger word would be 'Location' that can be provided as a voice prompt to the operator. Accordingly, various trigger words can be possible for initiating the method 1000 for identifying the performance status related to the execution of the workflow.

At step 1002, the workflow system 400 may include means such as, the communications interface 440 to access (e.g. via the workflow database 300) a data file including a historical voice dialogue corresponding to a past execution of a task of a workflow. In other words, to perform the identification of performance status associated with an ongoing task of the workflow, the workflow system 400 can access voice dialogues associated with a historical or previous execution of the task (e.g. of same type) of the workflow. An example of the data file including historical or previous voice dialogue, is illustrated and described later in reference to FIG. 12.

At step 1004, the workflow system 400 may include means such as, the context identification module 420 to parse the data file including the historical voice dialogue to identify a contextual keyword. Further, in some example embodiments, the context identification module 420 can also identify based on the parsing of the data file a contextual parameter associated with the contextual keyword. According to some example embodiments, the contextual keyword can be identified based on a pre-defined rule by parsing the historical voice dialogue. In some examples, parsing of the historical voice dialogue may further include performing lemmatization and string processing on the historical voice dialogue and extracting a feature set from the historical voice dialogue. The feature set may include instances of the where contextual keywords can be present. Details of the identification of the contextual keyword and/or the contextual parameters associated with the contextual keyword, are described earlier in reference to FIG. 4.

At step 1006, the contextual keyword and the contextual parameter associated with the contextual keyword can be provided as input feature to train a machine learning model. The machine learning model can be used for identification of performance status associated with the execution of the task of the workflow. Moving to step 1008, the workflow system 400 may include means such as, the machine learning engine 430 that can identify using the machine learning model a pattern associated with the contextual keyword and/or the contextual parameter. Identification of the pattern associated with the contextual keyword and/or the contextual parameter can be performed in a similar manner as described earlier in reference to FIG. 4.

In some examples, the machine learning engine 430 can identify the pattern associated with the contextual keyword and the contextual parameter based on a predefined rule. In some examples, the predefined rule can be defined according to a type of a task of the workflow. In other words, there can be different rules for identifying the pattern according to different types of the tasks and/or the workflow operation. To this end, it can be understood that there can be a variety of tasks to be performed for different types of workflows. For example, in a material handling environment, there can be different types for workflows like, but not limited to, item picking workflow, item placement workflow, shelf-replenishment workflow, cycle counting workflow, etc. that can be performed by various operators. Accordingly, the pre-defined rules for identification of the pattern can vary depending on the type of the workflow.

At step 1010, the workflow system 400 may include means such as, the machine learning engine 430 to predict a classification indicative of the performance status associated with the execution of the task of the workflow. As described earlier, the performance status can be indicative of a progress of an execution of the task of the workflow. For example, the performance status can indicate a normal execution of the task of the workflow. In another example, the performance status can indicate a delayed execution of the task of the workflow. In another example, the performance status can indicate a speedy execution of the task of the workflow. In another example, the performance status can indicate an incorrect execution of the task of the workflow. The method 1000 stops at step 1012.

FIG. 11 illustrates a flow diagram representing a method 1100 for providing a suggestion to improve a performance of a worker in executing a workflow operation, in accordance with an example embodiment. In some example embodiments, the method 1000 can be performed by any of the devices (102, 104, 110A-110N, 150, 160) as described earlier in reference to FIG. 1. The method 1100 starts at step 1102.

At step 1104, the workflow performance system 100 may include means such as, a voice controlled apparatus (e.g. the voice controlled apparatus 104) to provide a first voice prompt associated with a task of the workflow. In this regard, as described earlier, a voice prompt referred herein can represent an audio/voice based instruction that can be provided to an operator to perform a step associated with the task of the workflow.

As an example, a workflow operation can be related to picking of various items in a warehouse. In this aspect, a task of the workflow can be to pick an item from a storage location in the warehouse. Accordingly, in such example, the voice controlled apparatus 104 may provide a first voice prompt indicating a location in the warehouse from where an item is to be picked by the operator. In this aspect, upon reaching the location the operator may provide a voice response indicating that the operator has reached the location. Further, subsequent voice prompts provided by the voice controlled apparatus 104 related to the picking of other items.

At step 1106, the voice controlled apparatus 104 may receive a first voice response in response to the first voice prompt. As described earlier, the voice response referred herein can represent a spoken input responded by the operator in response to instructions provided in the voice prompt. As an example, for the picking operation, the first voice response can indicate a confirmation provided by the operator upon reaching the location. In an example, the first voice response can indicate numbers and/or letters of check digits that can be used to uniquely identify a storage location. Thus, in accordance with various example embodiments described herein, the voice controlled apparatus 104 can receive a voice response respectively for in response to each voice prompt provided to the operator.

Moving to step 1108, the voice controlled apparatus 104 can include means such as the processor 210 that can utilize the machine learning engine 430 to predict a performance status associated with the execution of the task of the workflow. As described earlier in reference to FIG. 4, the machine learning engine 430 can predict the performance status based on analyzing the first voice prompt and the first voice response. In this aspect, the first voice prompt and the first voice response can be analyzed by using a pattern associated with historical voice dialogue, as described in earlier in reference to FIGS. 1-10.

At step 1110, the processor 210 can determine if the performance status predicted at step 1108 is indicative of a normal operation. In this regard, a normal operation may indicate execution of a task of the workflow by the operator as per expected time or quality metrics associated with a type of the workflow. According to some example embodiments, the performance status can indicate a normal operation based on comparison of the performance status predicted at step 1108 with a pre-defined threshold. For instance, in an example of a picking workflow operation, the performance status can be determined as not indicative of a normal operation if the picking operation is a delayed pick (i.e. time invested by the operator in performing a task of the picking operation is more than an expected time). Similarly, for the picking workflow operation, the performance status can be determined as a normal operation if a time invested by the operator to perform a step of the picking operation is less than or equal to the expected time for performing the step.

In response to determination of the performance status to indicate a normal operation at step 1110, the method moves to step 1116. Alternatively, if the performance status is not indicative of the normal operation, the method moves to step 1112.

At step 1112, the processor 210 can identify an issue related to the execution of the task of the workflow. In an example embodiment, the processor can utilize the workflow system 400 to parse data files corresponding to historical data i.e. previous exchange of voice prompts and voice responses (e.g. associated with same type of task of the workflow) as described earlier, and further identify a pattern using the first voice prompt, the first voice response, and the historical data to identify the issue associated with execution of the task of the workflow.

In one example, the issue can indicate a co-ordination gap in the voice dialogue, i.e. exchange of voice based messages between the operator and the voice controlled apparatus 104. For instance, the co-ordination gap can indicate a mismatch between a voice response expected by the voice controlled apparatus 104 and an actual voice response provided by the operator, in response to a voice prompt. In other words, in an example the issue can be indicative of an unexpected or incorrect voice response provided by the operator to the voice controlled apparatus 104. In another example, the issue can be related to failure or fault in speech recognition performed by the voice controlled apparatus 104. This can happen in instances where a speech recognition model used by the voice controlled apparatus 104 is trained using speaker dependent template which does not include voice template for current operator performing the execution of the task of the workflow. Other types of issues (e.g. battery outage, device malfunctioning, incorrect route used by the operator etc.) can be possible that can cause performance status of the execution of task to deviate from normal operation.

At step 1114, the processor 210 can generate a message indicative of a suggestion to improve performance status of the task. As described earlier in reference to FIGS. 1-10, according to some examples, the suggestion corresponds to an activity that can be performed by the operator and/or the supervisor to improve the performance status of the execution of the task of the workflow. In other words, in some examples, the suggestion can indicate an activity that can be performed by the operator to cause efficient or faster execution of the task of the workflow. According to example embodiments described herein, the suggestion can be generated as a voice prompt that can be output by the speaker of the voice controlled apparatus 104 and/or a visual instruction that can be displayed on display screen of the electronic device 102. As described in description of FIGS. 1-10, there can be different types of suggestions (e.g. re-assigning the workflow to another worker, re-training the speech recognition model, providing an expected voice response etc., that can be generated and provided to the operator for improving the performance status.

Thus, by way of implementation of example embodiments described herein, in some instances, where it is determined at step 1110 that the performance status indicates execution of the task of the workflow, which is not as per normal operation, suggestions can be provided to the operator. Alternatively, in case of performance status indicative of normal operation, the method 1100 can move to the step 1116 at which a second voice prompt subsequent to the first voice prompt in the task of the workflow can be provided by the voice controlled apparatus 104 to the operator. The second voice prompt can include instructions for a next step that is to be performed by the operator after completing the instructions provided in the first prompt. Accordingly, as illustrated at step 1118, the voice controlled apparatus 104 can receive the second voice response in response to the second voice prompt.

In this manner, in case of performance status indicative of normal operation, the voice dialogue i.e. providing the instructions in form of voice prompts by the voice controlled apparatus 104 and receiving voice responses to the voice prompts can continue until the completion of the task or activity of the workflow operation. Further, upon completion of the required steps of the tasks by the operator, at step 1120, the voice controlled apparatus 104 can provide a voice prompt (e.g. a third voice prompt) that can indicate completion of the task of the workflow. The method stops at step 1122.

Figure 12:
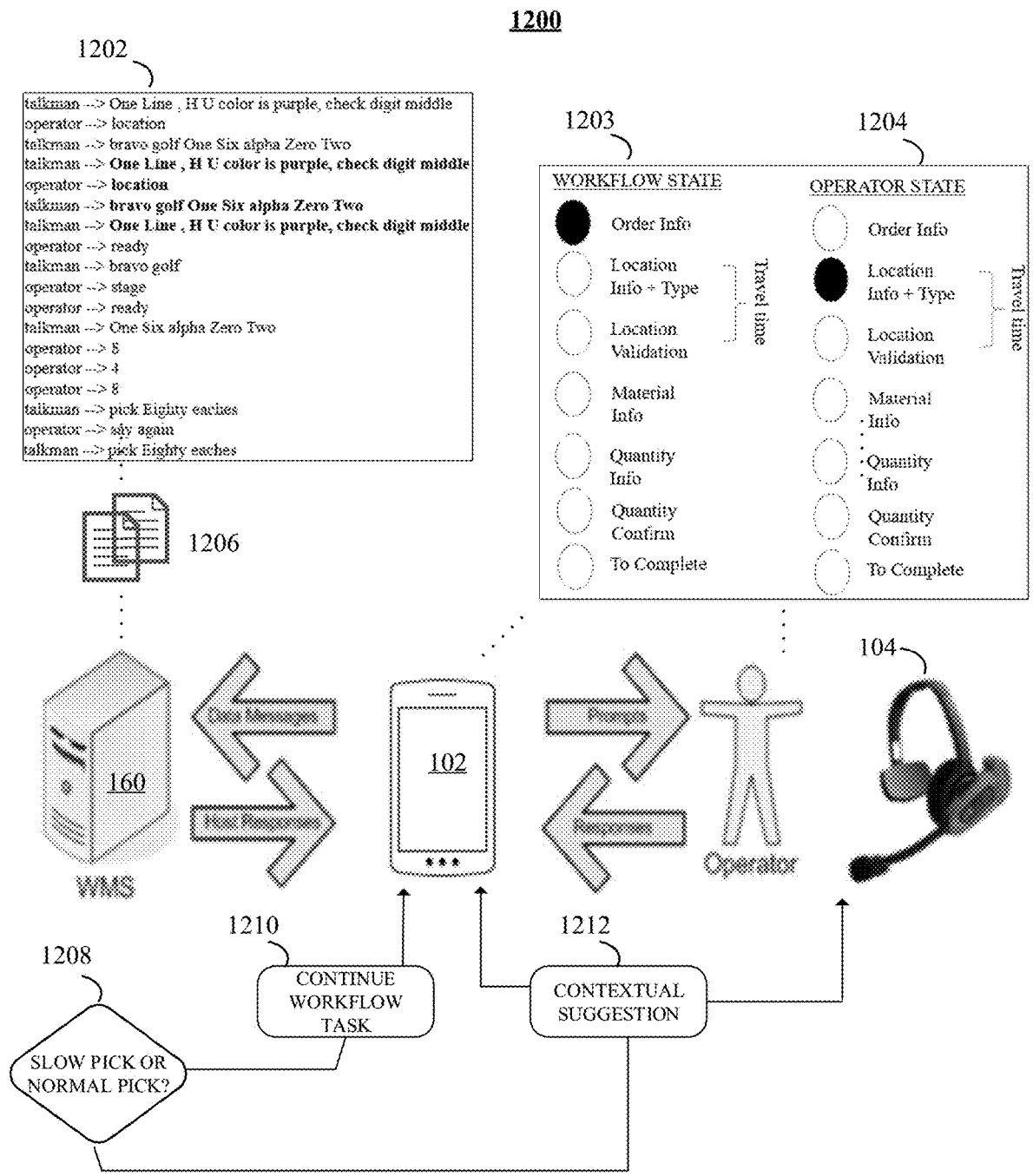
FIG. 12 illustrates an example scenario depicting a workflow operation performed by an operator, in accordance with an example embodiment.

FIG. 12 illustrates an example scenario depicting a workflow operation that can be performed by an operator, in accordance with an example embodiment. As illustrated, a work environment 1200 can include the server 160 (e.g. a warehouse management system WMS), the voice controlled apparatus 104, and the electronic device 102. The server 160, the voice controlled apparatus 104, and the electronic device 104 can be communicatively coupled amongst each other, over the network 103. As described previously in reference to FIG. 1, the electronic device 102 and the voice controlled apparatus 104 can correspond to a device (e.g. operator devices 110A-110N) that can be used by operators to perform the workflow operation.

In accordance with the example embodiment, an operator can use the voice controlled apparatus 104 and the electronic device 102 to perform one or more tasks of the workflow operation. In an example, the workflow operation can be an item picking operation for picking one or more items, for example, from a storage location in the warehouse. In this regard, in an example embodiment, the operator can wear the voice controlled apparatus 104 (e.g. a headset device) and receive instructions in form of voice prompts from the electronic device 102 to perform various steps associated with the workflow operation. For example, the operator can receive one or more voice prompts on the voice controlled apparatus 104 that can include instructions (such as instruction for, reaching a storage location, identifying items to be picked, confirming the items for picking, etc.) related to the picking of the items. In other words, various steps of the workflow operation can be performed based on the voice dialogue (i.e. exchange of voice prompts and voice responses) between the operator and the operator device.

As an example, as illustrated in FIG. 12, a voice dialogue 1202 can include multiple voice prompts that can be provided by the voice controlled apparatus 104 (referred herein as, Talkman) to the operator for performing steps of the workflow operation. Illustratively, the voice prompts are 'One Line, H U color is purple, check digit middle', 'bravo golf One Six alpha Zero Two', etc. In response to each voice prompt, the operator can perform a task required at respective step and provide a voice response to the voice prompts. As an example, as illustrated in the voice dialogue 1202, the voice responses provide by the operator includes 'Location', 'ready', '8', '4' etc. According to some examples, the voice response can be indicative of a performance or non-performance of the task instructed in the voice prompt. In some examples, the voice response can indicate any of, a confirmation, a data value, etc. indicative of performing of that step of the task of the workflow.

Further, the voice dialogue can be stored in one or more data files. As illustrated, the server 160 can receive a data file 1206 corresponding to exchange of the voice prompts and the voice responses between the voice controlled apparatus 104 and the operator. To this end, the server 160 can store the data file 1206 in a database (e.g. the workflow database 300, as described in FIG. 3). Further, in accordance with said example embodiment, the data file 1206 can be used by the workflow system 400 to identify performance status associated with the execution of the task of the workflow.

Also, as illustrated, the electronic device 102 can provide data messages to the server 160 and receive one or more host responses from the server 160. In some examples, the data messages can include for example, but not limited to, information pertaining to the voice dialogue (i.e. exchange of voice prompts and the voice responses) for various tasks of the workflow performed using the electronic device 102, request for downloading files comprising the workflow and instructions associated with the workflow from the server 160, configuration files to perform access control or role based configuration of the electronic device 104 according to an operator, etc.

According to the example embodiment, upon initiating an execution of a workflow operation, the electronic device 102 and the voice controlled apparatus 104 can maintain a workflow state 1203 and an operator state 1204, as illustrated in FIG. 12. The workflow state 1203 and the operator state 1204 can be representative of an application state of a step of the workflow that may be currently under execution. According to the example embodiment, for effective execution of each step of the workflow, the workflow state and the operator state can be in synchronization with each other. In other words, during effective execution of the workflow, a coordination between the voice prompt provided by the voice controlled apparatus 104 and the voice response provide by the operator is to be such that status change to from a current state to a next state of each of the workflow state and the operator state should happen simultaneously. In this regard, a status of the workflow state and the operator state can change upon execution of each step of the workflow. Below paragraph describes an example of change of status of workflow state and the operator state as in each step of the workflow operation is executed.

In an example, for an item picking operation workflow, as illustrated, the workflow states 1203 and the operator states 1204 can be 'order info', 'Location info+Type', 'location validation', 'Material info', and so on. In this regard, as execution of the item picking operation workflow is initiated, a first voice prompt associated with order information can be provided from the voice controlled apparatus 104 to the operator. Accordingly, at this instance, the status of the workflow state can be 'Order info'. Further, in response to the first voice prompt, the operator can provide a first voice response indicative of an acknowledgement by the operator for the order information. At this instance, the status of the operator state can also be 'Order info'. Further, a second voice prompt associated with location information for picking the item and type of the item can be provided to the operator. This can move the status of the workflow state to 'Location info+Type'. Furthermore, as the operator reaches the location to pick the item, the operator can provide a second voice response that may indicate a check digit or a confirmation that the operator is at the desired location. At this stage, the operator state can be 'Location info+Type'.

Accordingly, in a similar manner, the status of workflow state and the operator state can be changed as each step of the workflow gets executed.

According to various example embodiments described herein, in some situations, during the execution of a task of the workflow there may exist a coordination gap between the workflow state and the operator state. For instance, referring to the voice dialogue 1202, it may be observed that similar voice prompts (e.g. 'One Line, H U color is purple, check digit middle', 'bravo golf One Six alpha Zero Two') are repeatedly been provided by the voice controlled apparatus 104 (e.g. Talkman) to the operator. In some examples, this may happen because the operator may not provide back an expected voice response to the voice controlled apparatus 104. In some examples, the operator may be providing an expected voice response, however, a speech recognition engine of the voice controlled apparatus 104 may not recognize the voice response provided by the operator. In this regard, as described earlier in reference to FIGS. 1-11, a performance status related to execution of the task of the workflow can be identified, in near real time, for identification of such issues (e.g. coordination gap between the workflow states 1203 and the operator states 1204). Said differently, the performance status can be identified to indicate if the execution of the task of the workflow is progressing normally or not. Further, as described earlier in reference to FIGS. 1-11, a suggestion can be provided to improve the performance status of the task.

As illustrated, for the item picking workflow operation, in an example embodiment, the server 160 may include means such as, the processing unit to analyze the voice dialogue 1202 and determine (1208) if the picking operation is executed as a normal pick or a slow pick. In this aspect, in case the picking operation is executed as a normal picking, the server 160 may indicate the electronic device 104 and the voice controlled apparatus 104 to continue execution of the workflow task and move to next step. Alternatively, as described earlier, a contextual suggestion can be provided to the operator. The contextual suggestion can be received at the voice controlled apparatus 104 and/or the electronic device 102. Accordingly, by way of implementation of various example embodiments described herein, performance status indicative of a progress and/or performance of the execution of the task of the workflow operation can be identified. Further, based on the performance status, contextual suggestions to improve the performance status can be provided. This would result in improved execution of the workflow operation, thereby, increasing productivity of operators and overall throughput of a work environment.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module (or processor-executable instructions) which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the invention(s) set out in any claims that may issue from this disclosure. For instance, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of a local or networked system and/or circuitry 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program goods. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus, such as processor 210, workflow database 300, and/or workflow system 400 discussed above with reference to FIG. 2, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 220) that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

The invention claimed is:

1. A voice controlled apparatus comprising:
a microphone;
a speaker;
a processor communicatively coupled to at least one of the microphone and the speaker, wherein the processor is configured to:
generate, via the speaker, a voice prompt associated with a task of a workflow;
in response to the voice prompt, identify, via the microphone, a voice response from a worker, wherein the voice prompt and the voice response comprise a voice dialogue;
change, based on the voice dialogue, each of:
a workflow state from a first workflow state to a second workflow state; and
an operator state from a first operator state to a second operator state based on a performance status associated with execution of the task of the workflow, wherein each of the workflow state and the operator state is representative of an application state of a step of the workflow that is currently under execution;
identify, before providing a next voice prompt corresponding to the second workflow state subsequent to the voice prompt, the performance status associated with execution of the task of the workflow at the first workflow state based on analyzing the voice dialogue using a machine learning model, wherein identifying the performance status comprises at least determining whether a coordination gap exists between the first workflow state and the first operator state, wherein the coordination gap is indicative of a mismatch between the voice response provided by the operator at the first operator state and an expected voice response corresponding to the voice prompt corresponding to the first workflow state;
in response to determining the performance status as normal operation, simultaneously switching the first operator state to the second operator state, and the first workflow state to the second workflow state in the workflow; and
in response to determining the performance status corresponding to abnormal operation, generate a message comprising a suggestion to improve the performance status of the task.

2. The voice controlled apparatus of claim 1, wherein the performance status is further indicative of:
an incorrect execution of the task of the workflow.

3. The voice controlled apparatus of claim 1, wherein the processor is configured to:
access a data file comprising a historical voice dialogue corresponding to a past execution of the task;
parse the data file to identify, from amongst a plurality of historical voice responses in the historical voice dialogue, a contextual keyword and a contextual parameter associated with the contextual keyword, wherein the contextual parameter comprises at least one of, a frequency of occurrence of the contextual keyword in the historical voice dialogue and a timing information corresponding to each occurrence of the contextual keyword in the historical voice dialogue; and
provide the contextual keyword and the contextual parameter as an input feature to train the machine learning model.

4. The voice controlled apparatus of claim 3, wherein the processor is further configured to:
identify, using the machine learning model, a pattern associated with the contextual keyword and the contextual parameter, wherein the machine learning model identifies the pattern based on a pre-defined rule defined according to a type of task of the workflow; and
predict a classification indicative of the performance status associated with execution of the task by using the pattern.

5. The voice controlled apparatus of claim 1, wherein the suggestion is indicative of at least one of:
a correct location for picking an item;
a correct destination for placing the item;
a route for reaching one of: an item picking location or an item placement destination;
an expected voice response to the voice prompt according to the workflow;
re-training a speech recognition model according to a level of noise in a work environment;
retraining the speech recognition model according to a speaker dependent voice template;
a new workflow which is preferred for the worker; and
an option to reassign the task of the worker to another worker.

6. The voice controlled apparatus of claim 1, wherein the task is to pick an item and wherein processor is configured to identify the performance status indicative of one of:
a slow picking, in an instance in which a time taken to pick the item is slower than an expected time to pick the item; and
a normal picking, in an instance in which the time taken to pick the item is as per the expected time to pick the item.

7. A system comprising:
a processor configured to:
receive a voice dialogue comprising a first voice prompt and a first voice response to the first voice prompt, associated with a task of a workflow that is to be executed on a voice controlled apparatus;
change, based on the voice dialogue, each of:
a workflow state from a first workflow state to a second workflow state; and
an operator state from a first operator state to a second operator state based on a performance status associated with execution of the task of the workflow, wherein each of the workflow state and the operator state is representative of an application state of a step of the workflow that is currently under execution;
identify, before providing a second voice prompt corresponding to the second workflow state subsequent to the first voice prompt, the performance status associated with execution of the task at the first workflow state based on analyzing the voice dialogue using a machine learning model, wherein identifying the performance status comprises at least determining whether a coordination gap exists between the first workflow state and the first operator state, wherein the coordination gap is indicative of a mismatch between the voice response provided by the operator at the first operator state and an expected voice response corresponding to the voice prompt corresponding to the first workflow state;

in response to determining the performance status as normal operation, simultaneously switching the first operator state to the second operator state, and the first workflow state to the second workflow state in the workflow; and in response to determining the performance status corresponding to abnormal operation, generate a message indicative of a suggestion to improve the performance status of the task.

8. The system of claim 7, wherein the performance status is further indicative of:
an incorrect execution of the task of the workflow.

9. The system of claim 7, wherein the processor is configured to:
access a data file comprising a historical voice dialogue corresponding to a past execution of the task of the workflow;
parse the data file to identify, from amongst a plurality of historical voice responses in the historical voice dialogue, a contextual keyword and a contextual parameter associated with the contextual keyword, wherein the contextual parameter comprises at least one of, a frequency of occurrence of the contextual keyword in the historical voice dialogue and a timing information corresponding to each occurrence of the contextual keyword in the historical voice dialogue; and
provide the contextual keyword and the contextual parameter as an input feature to train the machine learning model.

10. The system of claim 9, wherein the processor is further configured to:
identify, using the machine learning model, a pattern associated with the contextual keyword and the contextual parameter, wherein the machine learning model identifies the pattern based on a pre-defined rule defined according to a type of task of the workflow; and
predict a classification indicative of the performance status associated with execution of the task by using the pattern.

11. The system of claim 7, wherein the suggestion is indicative of at least one of:
a correct location for picking an item;
a correct destination for placing the item;
a route for reaching one of: an item picking location or an item placement destination;
an expected voice response to the first voice prompt according to the workflow;
retraining a speech recognition model according to a level of noise in a work environment;
re-training the speech recognition model according to a speaker dependent voice template;
a new workflow which is preferred for a worker; and
an option to reassign the task of the worker to another worker.

12. The system of claim 7, wherein the task is to pick an item and wherein processor is configured to identify the performance status indicative of one of:
a slow picking, in an instance in which a time taken to pick the item is slower than an expected time to pick the item; and
a normal picking, in an instance in which the time taken to pick the item is as per the expected time to pick the item.

13. The system of claim 7, wherein the processor is configured to:
transmit, a file comprising the workflow on an electronic device, wherein the workflow is executed based on exchange of messages between the electronic device and the voice controlled apparatus; and
receive, workflow execution data comprising the voice dialogue associated with the execution of the task of the workflow by a worker.

14. The voice controlled apparatus of claim 1, wherein the voice response utilized to identify the coordination gap is successfully interpreted.

15. The voice controlled apparatus of claim 1, wherein the suggestion is indicative of a route for reaching one of an item picking location or an item placement destination.

16. A method comprising:
receiving, a voice dialogue comprising a first voice prompt and a first voice response to the first voice prompt, associated with a task of a workflow;
changing, based on the voice dialogue, each of:
a workflow state from a first workflow state to a second workflow state based on a performance status associated with execution of the task of the workflow; and
an operator state from a first operator state to a second operator state based on a performance status associated with execution of the task of the workflow, wherein each of the workflow state and the operator state is representative of an application state of a step of the workflow that is currently under execution;
identifying, before providing a second voice prompt corresponding to the second workflow state subsequent to the first voice prompt, the performance status associated with execution of the task at the first workflow state based on analyzing the voice dialogue using a machine learning model and change in the workflow state and the operator state, wherein identifying the performance status comprises at least determining whether a coordination gap exists between the first workflow state and the first operator state, wherein the coordination gap is indicative of a mismatch between the voice response provided by the operator at the first operator state and an expected voice response corresponding to the voice prompt corresponding to the first workflow state in response to determining the performance status as normal operation, simultaneously switching the first operator state to the second operator state, and the first workflow state to the second workflow state in the workflow; and in response to determining the performance status corresponding to abnormal operation, generating a message indicative of a suggestion to improve the performance status of the task.

17. The method of claim 16, comprising:
accessing a data file comprising a historical voice dialogue corresponding to a past execution of the task of the workflow;
parsing the data file to identify, from amongst a plurality of historical voice responses in the historical voice dialogue, a contextual keyword and a contextual parameter associated with the contextual keyword, wherein the contextual parameter comprises at least one of, a frequency of occurrence of the contextual keyword in the historical voice dialogue and a timing information corresponding to each occurrence of the contextual keyword in the historical voice dialogue; and
providing the contextual keyword and the contextual parameter as an input feature to train the machine learning model.

18. The method of claim 17, further comprising:
identifying, using the machine learning model, a pattern associated with the contextual keyword and the contextual parameter, wherein the machine learning model identifies the pattern based on a pre-defined rule defined according to a type of task of the workflow; and
predicting a classification indicative of the performance status associated with execution of the task by using the pattern.

19. The method of claim 16, wherein the suggestion is indicative of at least one of:
a correct location for picking an item;
a correct destination for placing the item;
a route for reaching one of: an item picking location or an item placement destination;
an expected voice response to the first voice prompt according to the workflow;
retraining a speech recognition model according to a level of noise in a work environment;
retraining the speech recognition model according to a speaker dependent voice template;
a new workflow which is preferred for a worker; and
an option to reassign the task of the worker to another worker.

20. The method of claim 16, wherein the task is to pick an item and wherein processor is configured to identify the performance status indicative of one of:
a slow picking, in an instance, in which a time taken to pick the item is slower than an expected time to pick the item; and
a normal picking, in an instance, in which the time taken to pick the item is as per the expected time to pick the item.

* * * * *